United States Patent
Zhou

(10) Patent No.: US 11,245,631 B2
(45) Date of Patent: Feb. 8, 2022

(54) BUM TRAFFIC CONTROL METHOD, RELATED APPARATUS, AND SYSTEM

(71) Applicant: Huawei Technologies Co., Ltd., Shenzhen (CN)

(72) Inventor: Daolong Zhou, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 209 days.

(21) Appl. No.: 16/457,120

(22) Filed: Jun. 28, 2019

(65) Prior Publication Data
US 2019/0319883 A1    Oct. 17, 2019

Related U.S. Application Data

(63) Continuation of application No. PCT/CN2017/109370, filed on Nov. 3, 2017.

(30) Foreign Application Priority Data

Dec. 29, 2016 (CN) .......................... 201611252200.1

(51) Int. Cl.
H04L 12/801 (2013.01)
H04L 12/721 (2013.01)
H04L 12/911 (2013.01)

(52) U.S. Cl.
CPC .............. H04L 47/15 (2013.01); H04L 45/32 (2013.01); H04L 45/66 (2013.01); H04L 47/11 (2013.01);
(Continued)

(58) Field of Classification Search
CPC . H04L 12/1877; H04L 12/1886; H04L 45/32; H04L 45/66; H04L 47/11; H04L 47/15; H04L 47/825; H04L 2212/00
See application file for complete search history.

(56) References Cited

U.S. PATENT DOCUMENTS

2011/0158248 A1* 6/2011 Vorunganti ............. H04L 47/20
370/412
2012/0236734 A1 9/2012 Sampath et al.
(Continued)

FOREIGN PATENT DOCUMENTS

CN    102684940 A    9/2012
CN    103763213 A    4/2014
(Continued)

OTHER PUBLICATIONS

Elangovan, Anush, "Efficient Multicasting and Broadcasting in Layer 2 Provider Backbone Networks", Cisco, IEEE Communications Magazine (vol. 43, Issue No. 11, Nov. 2005, XP01238485, 5 pages.

Primary Examiner — Asad M Nawaz
Assistant Examiner — Kai Chang
(74) Attorney, Agent, or Firm — Slater Matsil, LLP

(57) ABSTRACT

Embodiments of the present disclosure disclose a BUM traffic control method, a related apparatus, and a system. A traffic controller receives, through a tunnel, a BUM packet encapsulated by a network device in a target broadcast domain. The traffic controller collects, based on the received BUM packet, statistics about a BUM traffic value of a target object within a preset time period, and determines whether the BUM traffic value is greater than a preset BUM traffic threshold of the target object. If the BUM traffic value is greater than the preset BUM traffic threshold, the traffic controller controls BUM traffic of the target object, to reduce the BUM traffic of the target object. The foregoing solution can resolve a problem of BUM packet flooding caused by an increase in a quantity of hosts or an increase in a quantity of network devices in a communications network.

16 Claims, 10 Drawing Sheets

(52) U.S. Cl.
CPC ........ *H04L 47/825* (2013.01); *H04L 2212/00* (2013.01)

(56) References Cited

U.S. PATENT DOCUMENTS

| | | | |
|---|---|---|---|
| 2015/0063194 A1* | 3/2015 | Yang | H04L 67/06 370/312 |
| 2015/0172165 A1* | 6/2015 | Tessmer | H04L 12/1886 370/254 |
| 2016/0021015 A1* | 1/2016 | Thoria | H04L 47/2483 370/235 |
| 2016/0050684 A1 | 2/2016 | Ni | |
| 2016/0119156 A1* | 4/2016 | Drake | H04L 45/16 709/223 |
| 2016/0330046 A1* | 11/2016 | Yang | H04L 45/586 |
| 2016/0352531 A1* | 12/2016 | Shen, IV | H04L 12/4641 |
| 2017/0250904 A1* | 8/2017 | Singarayan | H04L 45/66 |
| 2018/0102944 A1* | 4/2018 | Mishra | H04L 43/0829 |
| 2018/0227135 A1 | 8/2018 | Drake et al. | |
| 2018/0338265 A1* | 11/2018 | Goel | H04L 45/02 |

FOREIGN PATENT DOCUMENTS

| | | |
|---|---|---|
| CN | 105099846 A | 11/2015 |
| CN | 105515978 A | 4/2016 |
| CN | 105553848 A | 5/2016 |
| EP | 3013006 A1 | 4/2016 |

\* cited by examiner

BUM TRAFFIC CONTROL METHOD, RELATED APPARATUS, AND SYSTEM

CROSS-REFERENCE TO RELATED APPLICATIONS

This application is a continuation of International Application No. PCT/CN2017/109370, filed on Nov. 3, 2017, which claims priority to Chinese Patent Application No. 201611252200.1, filed on Dec. 29, 2016. The disclosures of the aforementioned applications are hereby incorporated by reference in their entireties.

TECHNICAL FIELD

The present disclosure relates to the field of communications technologies, and in particular, to a BUM traffic control method, a related apparatus, and a system.

BACKGROUND

Currently, in a large-scale data center, to meet a cloud computing requirement, a Virtual Extensible LAN (VXLAN) network technology is usually used to construct a large layer 2 network, so as to virtualize a network. After the network is virtualized, the data center can contain more virtual machines (VM), and the VMs can dynamically migrate between servers.

However, through research and practice, the inventor of this application finds that an increase in a quantity of hosts (servers or VMs) in a large-scale data center leads to an increase in a quantity of network devices (such as switches) in a VXLAN network. In one layer 2 broadcast domain, BUM traffic sent by each host is flooded in the entire layer 2 domain after being forwarded by a network device. BUM packets of an entire network linearly increase with an increase in a quantity of hosts. Due to a large quantity of BUM packets, normal communication bandwidth in the network is occupied. In addition, each host in the layer 2 broadcast domain needs to process a large quantity of BUM packets, and as a result, CPU resources in a server are consumed.

SUMMARY

A technical issue that the embodiments of the present disclosure are intended to resolve is to provide a BUM traffic control method, a related apparatus, and a system, so as to resolve a problem of BUM packet flooding caused by an increase in a quantity of hosts in a communications network, and implement effective control on a BUM packet.

According to a first aspect, a BUM traffic control method is provided, where the method is applied to a target broadcast domain of a communications network, the target broadcast domain includes a traffic controller, a network device, and a host connected to the network device, the traffic controller is in a communications connection to the network device through a tunnel, and the method is applied to a traffic controller side and includes: receiving, by the traffic controller through a tunnel, a BUM packet encapsulated by a network device in the target broadcast domain; collecting, by the traffic controller based on the received BUM packet, statistics about a BUM traffic amount of a target object within a preset time period, and determining whether the BUM traffic amount is greater than a preset BUM traffic threshold of the target object, where the target object is the target broadcast domain, a network device in the target broadcast domain, or a host connected to a network device in the target broadcast domain; and if the BUM traffic amount is greater than the preset BUM traffic threshold, controlling, by the traffic controller, BUM traffic of the target object, to reduce the BUM traffic of the target object.

According to a second aspect, a BUM traffic control method is provided, where the method is applied to a target broadcast domain of a communications network, the target broadcast domain includes a traffic controller, a network device, and a host connected to the network device, the traffic controller is in a communications connection to the network device through a tunnel, and the method includes: receiving, by the network device, a BUM packet sent by the host; encapsulating, by the network device, the BUM packet to obtain an encapsulated BUM packet; and sending, by the network device, the encapsulated BUM packet to the traffic controller through the tunnel based on a member list, where the member list is configured in the network device, and the member list records an identifier of the traffic controller in the target broadcast domain.

The BUM traffic control method provided in the embodiments of the present disclosure is described in the first aspect and the second aspect from the traffic controller side and a network device side, respectively. It can be learned that, through implementation of the technical solutions in the embodiments of the present disclosure, after the traffic controller is introduced into the communications network, the traffic controller may receive the BUM packet encapsulated by the network device in the target broadcast domain, and collect traffic statistics; when finding that the BUM traffic amount of the target object in the target broadcast domain is greater than the preset BUM traffic threshold, the traffic controller controls the BUM traffic of the target object (the target broadcast domain, the network device, the host, or the like), to reduce the BUM traffic of the target object. This implements effective control on BUM traffic. Implementing the method can resolve the problem of BUM packet flooding caused by an increase in a quantity of hosts, and implement effective control on a BUM packet.

With reference to the first aspect, in some possible implementations, the traffic controller gathers, through the tunnel based on a member list, the BUM packet encapsulated by the network device in the target broadcast domain, where the member list is configured in the traffic controller, and the member list records identifiers of the network devices in the target broadcast domain.

With reference to the second aspect, in some possible implementations, the network device sends the encapsulated BUM packet to the traffic controller through the tunnel based on the member list, where the member list is configured in the network device, and the member list records the identifier of the traffic controller in the target broadcast domain.

It can be learned that, for implementation of the technical solutions in the embodiments of the present disclosure, corresponding configuration needs to be performed on the traffic controller side and the network device. After being configured, when the network device needs to send a BUM packet to the target broadcast domain (a layer 2 broadcast domain), the network device only needs to send the BUM packet to the traffic controller; correspondingly, the traffic controller gathers the BUM packet sent by the network device in the target broadcast domain. This helps the traffic controller control all BUM packets. The target broadcast domain may be one layer 2 broadcast domain, may be a collection of a plurality of layer 2 broadcast domains, or may be a broadcast domain of the entire network (an entire data center).

With reference to the first aspect or the second aspect, in some possible implementations, the collecting, by the traffic controller, statistics about the BUM traffic amount of a target object, and determining whether the BUM traffic amount is greater than a preset BUM traffic threshold of the target object includes one or a combination of more than one of the following manners: collecting, by the traffic controller based on a network identifier of the target broadcast domain, statistics about a BUM packet in the target broadcast domain, to obtain a total quantity of BUM packets that need to be sent to the target broadcast domain within the preset time period (for example, per second), and determining whether the BUM packet in the target broadcast domain (the total quantity of packets that need to be sent to the target broadcast domain) exceeds a preset BUM traffic threshold of the target broadcast domain; collecting, by the traffic controller based on a port IP address of the network device, statistics about a BUM traffic amount of the network device, to obtain a total quantity of BUM packets sent from the network device within the preset time period (for example, per second), and determining whether the BUM packet of the network device (the total quantity of packets sent from the network device) exceeds a preset BUM traffic threshold of the network device; and collecting, by the traffic controller based on a MAC address or an IP address of the host, statistics about a BUM traffic amount of the host, to obtain a total quantity of original packets that are sent within the preset time period (for example, per second) from the host (or a VM) connected to the network device, and determining whether the BUM packet of the host connected to the network device (the total quantity of original packets sent from the host connected to the network device) exceeds a preset BUM traffic threshold of the host.

In other words, the traffic controller may collect traffic statistics based on a plurality of dimensions (the target broadcast domain, the network device, or the host connected to the network device), to determine whether the BUM traffic amount exceed the thresholds. The collecting traffic statistics is collecting statistics about a quantity of packets and a packet length, to obtain, a total quantity of packets received within the preset time period (for example, per second).

With reference to the first aspect or the second aspect, in some possible implementations, the controlling, by the traffic controller, BUM traffic of the target object includes: processing, by the traffic controller, a BUM packet of the target object, where a processing manner of the packet includes discarding and at least one of the following manners: recording a log, sending an alarm, redirecting to a specified port, or redirecting to a specified communication channel.

Specifically, the packet discarding includes: discarding a BUM packet, in BUM packets of the target object, which has a priority lower than a preset level or is repeatedly received for more than a preset quantity of times within unit time. For example, a priority of a packet may be preset; after the traffic controller identifies the priority of the packet, if finding that the priority of the packet is lower than the preset level, the traffic controller discards the packet whose priority is lower than the preset level. For another example, the traffic controller may collect statistics about a quantity of repeated receptions of a packet within a preset time period; if finding that the quantity of repeated receptions is greater than the preset quantity of repeated receptions, the traffic controller discards the packet.

The recording a log includes: recording feature information of the packet. Recording a log is recording feature information of a BUM packet of the target object in a memory of the traffic controller if the BUM packet is beyond a limit. The feature information may be a host (a server or a VM) related to the packet, a network device related to the packet, a packet protocol type, a packet reception time, and the like. A log is recorded for a BUM packet that exceeds the preset BUM traffic threshold, so that a network manager (or a related user) views related information to determine which service/which host/which network device/which broadcast domain has a problem of excessive BUM traffic. It can be understood that, after discarding the packet, the traffic controller may also record the discarded packet, so that the network manager (or the related user) learns about the discarding.

The sending an alarm includes: sending traffic alarm information to a network control unit, where the network control unit is a unit configured to monitor the BUM traffic. In an embodiment, the network control unit may be an independent host located in the communications network, and a monitoring platform or monitoring software runs in the host. When the traffic controller determines that the BUM traffic of the target object is beyond a limit or is excessive, the traffic controller sends the traffic alarm information to the independent host, so that the network manager (or the related user) can obtain traffic excessiveness information by using the monitoring platform or the monitoring software of the host, and perform corresponding processing in a timely manner. In another embodiment, the network control unit may alternatively be the network device that sends the BUM packet or the host connected to the network device. When the traffic controller determines that the BUM traffic of the target object is beyond a limit or is excessive, the traffic controller sends the traffic alarm information to the network device or the host, so that the network device or the host restrains a BUM packet sending behavior of the network device or the host. Specifically, a strategy of processing the traffic alarm information may be preconfigured in the network device or the host. In this case, when receiving the traffic alarm information sent by the traffic controller, the network device or the host restrains sending of a related BUM packet. This facilitates traffic control from a BUM packet source (the network device or the host).

The redirecting to a specified port includes: sending some or all of the BUM packets to the specified port. Specifically, a traffic analysis unit may be disposed in the traffic controller. The traffic analysis unit may be a traffic analysis platform that runs on a processor of the traffic controller, or may be another independent processor disposed in the traffic controller. Either the traffic analysis platform or the independent processor is configured to deeply analyze a traffic excessiveness status, to obtain a comprehensive traffic control policy. For example, when determining that the BUM traffic of the target object is beyond a limit, the traffic controller sends the BUM packet to the traffic analysis platform or the independent processor by using the specified port (some or all of the packets may be sent in a traffic replication manner). After receiving the BUM packet, the traffic analysis platform or the independent processor provides an optimum traffic processing solution (for example, instructing the traffic controller to perform BUM packet control) with reference to a current network status (for example, a current network structure and a congestion degree of current network bandwidth) and BUM packet statistics.

The redirecting to a specified communication channel includes: sending some or all of the BUM packets to the specified communication channel. Specifically, an independent traffic analysis host maybe disposed in the communications network. The traffic analysis host is configured to deeply analyze a traffic excessiveness status, to obtain a comprehensive traffic control policy. For example, when determining that the BUM traffic of the target object is beyond a limit, the traffic controller sends the BUM packet to the traffic analysis host through the communication channel (some or all of the packets may be sent in a traffic replication manner). For example, in a VXLAN network, the specified communication channel is a specified VXLAN tunnel. The traffic controller sends the BUM packet to the traffic analysis host through the specified VXLAN tunnel. After receiving the BUM packet, the traffic analysis host provides an optimum traffic processing solution (for example, instructing the traffic controller to perform BUM packet control) with reference to a current network status (for example, a current network structure and a congestion degree of current network bandwidth) and BUM packet statistics. It should be noted that, in a specific embodiment, the traffic analysis host is the foregoing network control unit used as an independent host.

With reference to the first aspect or the second aspect, in some possible implementations, after the traffic controller controls the BUM traffic of the target object, the traffic controller sends a BUM packet left after control to the target broadcast domain, and a source IP address in the BUM packet left after control is an IP address of the network device. For example, in a VXLAN network, in a BUM packet sent to the target broadcast domain by using the traffic controller, in VXLAN encapsulation, an outer destination MAC address is replaced with a MAC address of a VTEP of a next-hop device, an outer source MAC address is replaced with a MAC address of a VTEP of the traffic controller, and an outer destination IP address is replaced with an IP address of a VTEP of a destination network device. However, a source IP address remains unchanged. the source IP address is still an IP address of a VTEP of the network device. An original packet also remains unchanged, another field of the packet also remains unchanged, and a CRC of the entire packet is recalculated.

It should be noted that a purpose of keeping the source IP address as the IP address of the network device (the transmit-end network device) is as follows: When the network device corresponding to the outer destination IP (the receive-end network device) receives the packet, because the source IP address is identified as the IP address of the network device (the transmit-end network device), it is considered by default that the packet is sent by the network device (the transmit-end network device). In other words, the receive-end network device is unaware of existence of the traffic controller used as a centralized processing point of traffic. Therefore, after the traffic controller is introduced into an existing communications network, normal communication identification of the existing communications network is not affected. This facilitates application of the technical solutions of the embodiments of the present disclosure to the existing communications network.

With reference to the first aspect or the second aspect, in some possible implementations, there may be one or more traffic controllers.

When there is one traffic controller, the traffic controller may process a BUM packet in only one layer 2 broadcast domain, or may simultaneously process BUM packets in a plurality of layer 2 broadcast domains. When there are a plurality of traffic controllers, one traffic controller may be assigned to correspondingly perform processing for one layer 2 broadcast domain.

With reference to the first aspect or the second aspect, in some possible implementations, the traffic controller is a switch, a router, or a host. In other words, the traffic controller may be any one or a combination of more than one of the switch, the router, and the host.

With reference to the first aspect or the second aspect, in some possible implementations, the target broadcast domain may be a specified broadcast domain in a VXLAN network, a specified broadcast domain in a GRE network, or a specified broadcast domain in a VPLS network. the BUM traffic control method provided in the embodiments of the present disclosure may be applicable to a communications network with a tunnel encapsulation solution, for example, the VXLAN network, the GRE (NVGRE) network, or the VPLS network.

According to a third aspect, a traffic controller is provided. The traffic controller includes an Ethernet switching chip, a processor, a memory, and a device interface. The device interface is configured to connect to a network device. The memory is configured to store one or more groups of program code. The processor is configured to invoke the program code stored in the memory, so as to control the Ethernet switching chip to execute the BUM traffic control method according to any one of the first aspect or the implementations of the first aspect.

According to a fourth aspect, a network device is provided. The network device includes an Ethernet switching chip, a processor, a memory, and a device interface. The device interface is configured to connect to a traffic controller. The memory is configured to store one or more groups of program code. The processor is configured to invoke the program code stored in the memory, so as to control the Ethernet switching chip to execute the BUM traffic control method according to any one of the second aspect or the implementations of the second aspect.

According to a fifth aspect, a traffic controller is provided. The traffic controller includes a receiving module, a statistics collection module, a determining module, a control module, and a sending module, and is configured to execute the BUM traffic control method according to any one of the first aspect or the implementations of the first aspect.

According to a sixth aspect, a network device is provided. The network device includes a receiving module, a processing module, and a sending module, and is configured to execute the BUM traffic control method according to any one of the second aspect or the implementations of the second aspect.

According to a seventh aspect, a communications system is provided. The communications system includes a traffic controller and a network device. In an implementation, the traffic controller may be the traffic controller described in content of the third aspect, and the network device may be the network device described in content of the fourth aspect. In another implementation, the traffic controller may alternatively be the traffic controller described in content of the fifth aspect, and the network device may alternatively be the network device described in content of the sixth aspect.

According to an eighth aspect, a storage medium is provided, and is configured to store implementation code of the method according to the first aspect or the second aspect.

In the embodiments of the present disclosure, when the host in the communications network needs to send the BUM packet to another host by using the network device, the network device only needs to send the BUM packet to the traffic controller. The traffic controller receives the BUM packet, collects the statistics about the BUM traffic amount of the target object, and determines whether the BUM traffic is beyond a limit. If the BUM traffic is beyond a limit, the traffic controller controls the BUM traffic that is beyond a limit, and sends a remaining BUM packet to another network device in the target broadcast domain after performing control. The another network device receives the BUM packet, and then forwards the BUM packet to the host in the corresponding broadcast domain. In other words, after the traffic controller is introduced, BUM packet control can be implemented in three dimensions: the broadcast domain, the network device, and the host, so as to control BUM traffic in the broadcast domain, the network device, and the host to be within a proper range. This effectively resolves a problem that BUM traffic sharply increases after a quantity of network devices or a quantity of hosts increases, and further avoids a problem that large BUM traffic occupies network bandwidth and consumes a server CPU. In addition, in this process, the network device does not need to traverse all members in a header replication list corresponding to the target broadcast domain, but only needs to configure the member list including the identifier of the traffic controller; and the network device only needs to send the BUM packet to the traffic controller based on the member list. Therefore, the network device does not need to configure a BUM packet forwarding policy for another network device in the target broadcast domain. This can effectively reduce load of the network device.

BRIEF DESCRIPTION OF THE DRAWINGS

To describe the technical solutions in the embodiments of the present disclosure or in the prior art more clearly, the following briefly describes the accompanying drawings required for describing the embodiments or the prior art.

DETAILED DESCRIPTION OF ILLUSTRATIVE EMBODIMENTS

Terms used in the embodiments of the present disclosure are merely intended to explain specific embodiments of the present disclosure, but are not intended to limit the present disclosure.

Figure 1:
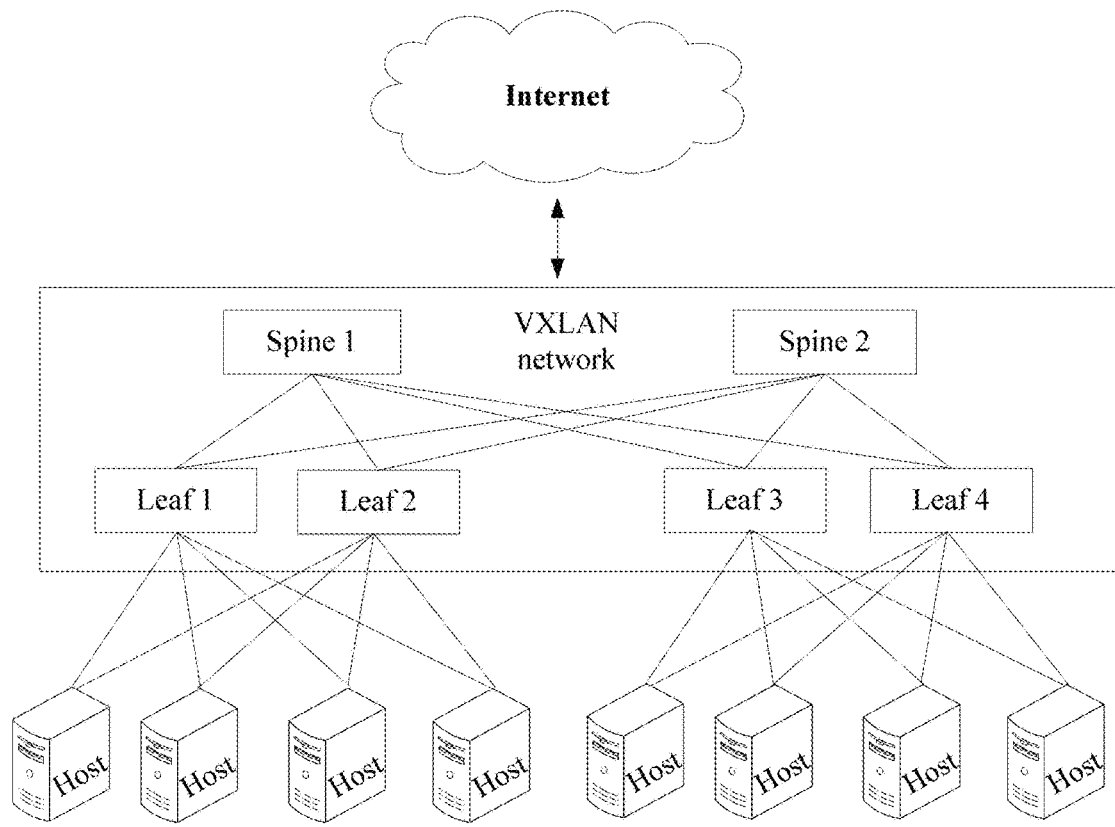
FIG. 1 is a schematic diagram of a large layer 2 network "spine-leaf" fabric of a large-scale data center in the prior art.

First, a large layer 2 fabric of a large-scale data center in the prior art is described. Referring to FIG. 1, FIG. 1 is a schematic diagram of a large layer 2 network "spine-leaf" fabric of a large-scale data center in the prior art.

As shown in FIG. 1, a "spine-leaf" fabric of the large-scale data center in the prior art includes the following:

(1) Spine device: A spine device is located at a core layer of the fabric, and the spine device is responsible for connecting to a lower-layer leaf device, and is also responsible for communicating with the Internet.

(2) Leaf device: A leaf device is located at an access layer of the fabric. One leaf device may be connected to one or more hosts (a server or a virtual machine running above a server). The leaf device is configured to forward a communication packet between the host connected to the leaf device and another network unit (for example, another host).

Figure 2:
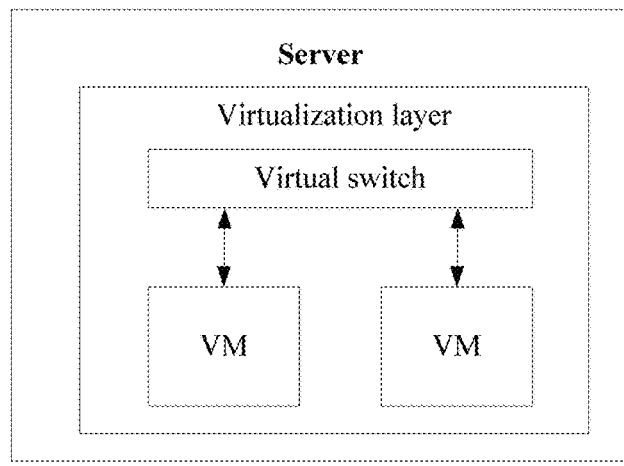
FIG. 2 is a schematic structural diagram of a host of a large-scale data center in the prior art.

(3) Host connected to the leaf device: The host may be a server, or may be a virtual machine (virtual machine, VM) running above a server. Usually, each server may contain one virtual switch and a plurality of VMs. As shown in FIG. 2, a virtual switch and VMs are created, and run at a virtualization layer above each server. The virtualization layer implements virtualization and scheduling of a physical resource on the server, for use by one or more VMs. The VM is configured to communicate with another VM by using the fabric. The virtual switch may manage communication between multiple VMs in the server.

To ensure network stability and reliability of the data center, a plurality of spine devices and leaf devices are usually disposed in the fabric, to perform backup and fault tolerance. As shown in FIG. 1, one host is associated with a plurality of leaf devices, and one leaf device is associated with a plurality of spine devices. In a specific operation, fa plurality of leaf devices may be combined into a cluster switch system (CSS) in a stacking manner, and in the CSS, switches of a same type may perform redundancy backup; for the spine device, a plurality of spine devices are usually combined into an all-active gateway to improve core-layer reliability, and in all-active gateway networking, same gateway information is deployed for a plurality of spine devices, to externally simulate the spine devices as one virtual VTEP in a VXLAN network; then, Layer 3 gateways are configured on all the spine devices, so that regardless of which spine traffic is sent to, the spine device can provide a service and correctly forward a packet to a next-hop device.

For a data center system based on VXLAN technology, a spine device and a leaf device may communicate with each other by using a VXLAN network. In the VXLAN network, it may be considered that there are any quantity of hosts. That is, there may be any quantity of servers, and each server may contain any quantity of virtual switches and any quantity of VMs.

Figure 3:
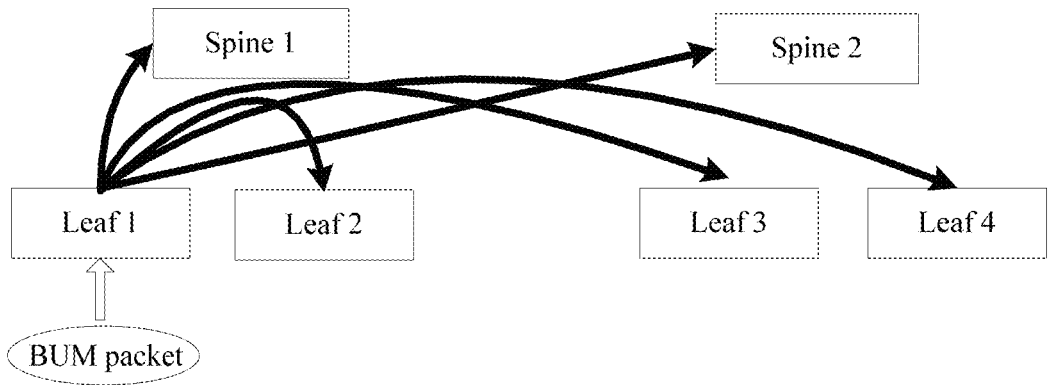
FIG. 3 is a schematic diagram of sending a BUM packet to another network device by a leaf device in the prior art.

In the VXLAN network, when a host needs to send a BUM packet to the VXLAN network, a related network device in the VXLAN network may send the BUM packet in a header replication manner. For example, as shown in FIG. 3, when a leaf 1 receives a BUM packet sent by a host, the leaf 1 switch replicates the BUM packet, and sends a BUM packet to each of other network devices (a leaf 2, a leaf 3, a leaf 4, a spine 1, and a spine 2) in a same layer 2 broadcast domain.

Figure 4:
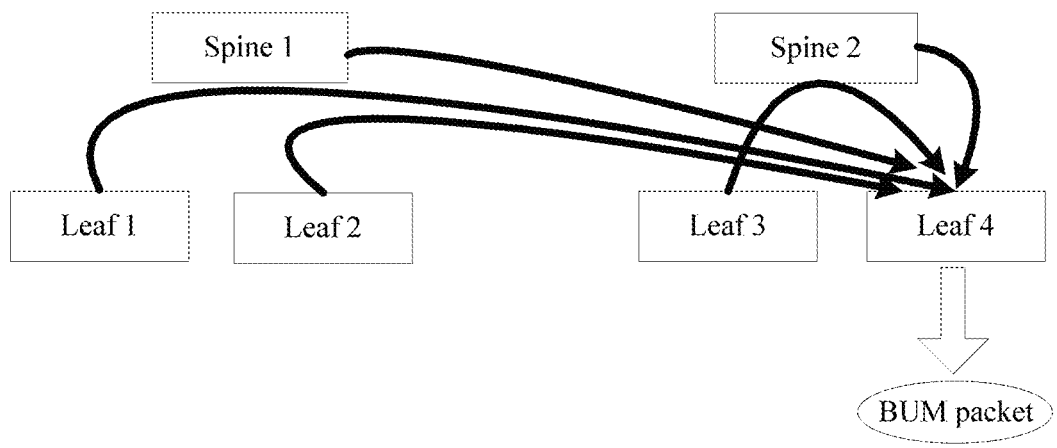
FIG. 4 is a schematic diagram of receiving, by a leaf device, a BUM packet sent by another network device in the prior art.

Correspondingly, in the VXLAN network, the host also receives a BUM packet sent by the VXLAN network. For example, as shown in FIG. 4, a leaf 4 switch may simultaneously receive BUM packets sent by other devices (any one or more of a leaf 1, a leaf 2, a leaf 3, a spine 1, and a spine 2) in a same layer 2 broadcast domain, and further, the leaf 4 switch forwards the BUM packet to the host.

However, as a quantity of hosts of the large-scale data center greatly increases and a quantity of network devices (for example, switches) in the VXLAN network correspondingly greatly increases, understandably, BUM traffic in the VXLAN network sharply increases. This causes the following bad impact on the VXLAN network:

The network device sends, based on a header replication list, the BUM packet to a member (another network device) in the list in the header replication manner. When a quantity of network devices in the VXLAN network greatly increases, the network device needs to greatly increase a quantity of header replication lists, and further needs to configure a BUM packet forwarding policy for each member in the list. This increases load of the network device.

In addition, a large quantity of BUM packets are sent by different network devices to the network, and are flooded in an entire layer 2 domain. As a result, a large amount of bandwidth in the network is occupied. Moreover, the host in the VXLAN network needs to process the BUM packet, and therefore, when a large quantity of BUM packets are sent to the host within a short time, a CPU of the host is greatly consumed.

Figure 5:
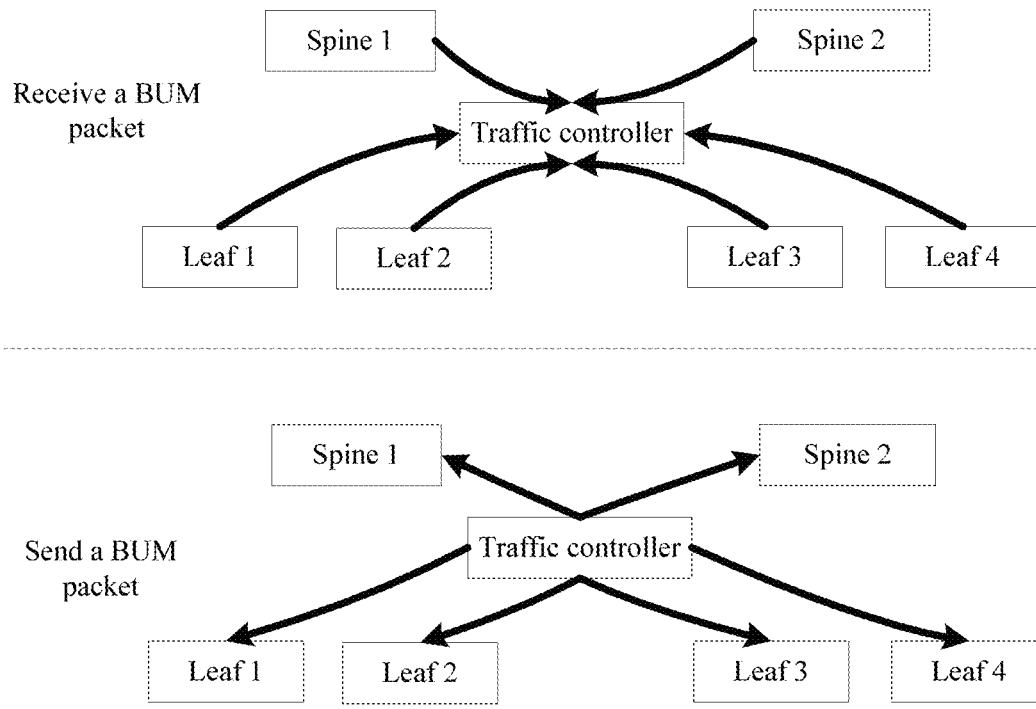
FIG. 5 is a schematic diagram of receiving and sending a BUM packet by a traffic controller according to an embodiment of the present disclosure.

To overcome a disadvantage in the prior art, resolve a problem of a sharp increase in BUM traffic caused by a great increase in a quantity of hosts and a great increase in a quantity of network devices, and implement effective control on a BUM packet in a communications network, the embodiments of the present disclosure provide a new communications network system. Differences between the communications network system and the foregoing prior-art communications network include the following:

(1) A traffic controller is disposed in a communications network, and the traffic controller is configured to receive a BUM packet in the communications network. In other words, referring to FIG. 5, when a network device (for example, a leaf or a spine) in the communications network needs to send a BUM packet, the network device only needs to send the BUM packet to the traffic controller. The traffic controller determines a processing policy of the BUM packet based on a traffic policy configured in the traffic controller. After determining the processing policy of the BUM packet, the traffic controller sends the BUM packet to the communications network, to control BUM traffic in a broadcast domain, a network device, and a host to be within a proper range. This avoids a problem that large BUM traffic occupies network bandwidth and consumes a server CPU.

(2) A BUM packet forwarding policy is configured on the network device that needs to send the BUM packet. When the network device needs to send the BUM packet to the communications network, the network device only needs to send the BUM packet to the traffic controller based on the BUM packet forwarding policy, and the traffic controller completes subsequent sending of the BUM packet. the network device does not need to traverse a header replication list of a broadcast domain corresponding to the BUM packet of the communications network, but only needs to configure a member list including an identifier of the traffic controller; and the network device only needs to send the BUM packet to the traffic controller based on the member list. In other words, in this process, the network device does not need to configure a BUM packet forwarding policy for another network device in the communications network. This can effectively reduce load of the network device.

From the foregoing analysis, it can be learned that the new communications network system in this application may be an improved solution made based on an existing communications network. In the improved solution, BUM traffic in the communications network can be effectively controlled, provided that the traffic controller is introduced and information about the traffic controller is configured in the transmit-end network device. In addition, after the traffic controller is introduced into the communications network, the BUM packet is sent by the traffic controller; therefore, to avoid mis-determining by a traffic-reception-end network device on the received BUM packet or an identification error, in the improved solution, when performing traffic control processing, the traffic controller keeps a tunnel source IP address in the BUM packet unchanged. Therefore, when receiving the BUM packet, another network device is unaware of existence of the traffic controller. This avoids negative impact that may be caused by communications network improvement, on existing normal communication.

Based on the foregoing new communications network system, an embodiment of the present disclosure provides a BUM traffic control method. The BUM traffic control method is applicable to a communications network with a tunnel encapsulation solution, for example, a VXLAN network, a GRE (Generic Routing Encapsulation) network, or a VPLS (Virtual Private LAN Service) network. For ease of detailed description of the solutions, the following describes the technical solutions in the embodiments of the present disclosure based on the VXLAN network. Implementations of other communications networks (the GRE network, the VPLS network, and the like) are similar to an implementation of the VXLAN, and details are not described again. In the present disclosure, description of the VXLAN network is merely intended to explain the technical solutions in the embodiments of the present disclosure, and shall not constitute any limitation on an applicable scope of the present disclosure.

For ease of understanding, the following first describes some related concepts or terms mentioned in application of the embodiments of the present disclosure to the VXLAN network.

(1) BUM packet (broadcast, unknown-unicast and multicast) packet:

Broadcast is a one-to-all communication mode between hosts. In a broadcast domain, a broadcast packet sent by each host can be received by all other hosts.

An unknown unicast propagation process in a broadcast domain is similar to a broadcast. For example, when a network device receives a unicast frame, the network device finds that a MAC table does not include a destination MAC address of the unicast frame. In this case, the unicast frame is an unknown unicast frame, and the device (such as a switch) floods the unicast frame.

Multicast can implement point-to-multipoint communication, and devices interested in same content need to be added to a same multicast group. A multicast packet is flooded in a layer 2 network by default, and can be propagated across network segments (a broadcast can be propagated only in one network segment).

It can be learned that flooding of a broadcast frame, an unknown unicast frame, and a multicast frame in a broadcast domain has a same feature. Therefore, the broadcast frame, the unknown unicast frame, and the multicast frame may be collectively referred to as a BUM packet. In other words, the BUM packet may be one or a combination of more than one of the broadcast frame, the multicast frame, and the unknown unicast frame. Correspondingly, BUM traffic is traffic resulting from the BUM packet.

In the embodiments of the present disclosure, during description of the BUM packet (or the BUM traffic), it should be understood that the description applies to all of the broadcast frame, the unknown unicast frame, and the multicast frame. In addition, during description of one frame (for example, the broadcast frame), it should also be understood that the description may be extended to other frames (the unknown unicast frame and the multicast frame), and the description shall not be construed as a limitation on the present disclosure.

(2) Broadcast domain: A broadcast domain is usually a collection of all devices that can receive a broadcast frame sent by any device and that are in a communications network. In other words, after a device sends a broadcast packet, coverage within which all devices can receive the packet is a broadcast domain. In the embodiments of the present disclosure, the broadcast domain may be applicable to description of any frame in the BUM packet. For example, for the multicast frame, the VXLAN has chosen to use IP multicast to carry layer 2 broadcast traffic. Each device VTEP is added to a specific multicast group, and the multicast group may be considered as a broadcast domain in an Ethernet environment. If a VM sends an Address Resolution Protocol (ARP) request, and the request is sent to the multicast group after being encapsulated by a VTEP, all VTEPs added to the multicast group receive the ARP request.

(3) VXLAN: Virtual Extensible LAN (VXLAN) is one of Network Virtualization Overlays (NVO3) standard technologies defined by the IETF, uses an L2 over L4 (MAC-in-UDP) packet encapsulation mode, and can implement extension of a layer 2 network within a Layer 3 range, so as to contain a large quantity of tenants and satisfy a migration requirement of a virtual machine in a large layer 2 network of a data center.

(4) VXLAN tunnel: A VXLAN tunnel is a logical concept. An original packet of a host is encapsulated by using the VXLAN tunnel, so that an encapsulated packet can be transmitted on a bearer network (for example, an IP network). After arriving at a destination, the encapsulated packet is decapsulated to obtain the original packet, and the original packet is forwarded to a destination host, thereby implementing layer 2 communication between the hosts. From a perspective of the host, it seems like there is a straight-through link between a start point and an end point of the original packet. The link that seems straight-through is the VXLAN tunnel. The VXLAN tunnel is a virtual channel established between two VTEPs. Because the VXLAN tunnel is based on a point-to-multipoint tunnel encapsulation protocol, a structure and details of an intermediate network can be completely ignored, so that original-data transmission or virtual-machine migration is implemented.

(5) VTEP: A VXLAN tunnel end point (VTEP) is a device in the VXLAN network. In the embodiments of the present disclosure, the VTEP may be a network device (for example, a switch such as a leaf or a spine), or may be a server on which a virtual machine is located. A VTEP location is a start point or an end point of the VXLAN tunnel. In the VTEP, processing (for example, encapsulation and decapsulation) may be performed on a VXLAN packet. The VTEP may determine a direction of a BUM packet based on a VNI, and then complete forwarding of the BUM packet on a switch by using outer layer 2 and Layer 3 headers.

Figure 6:
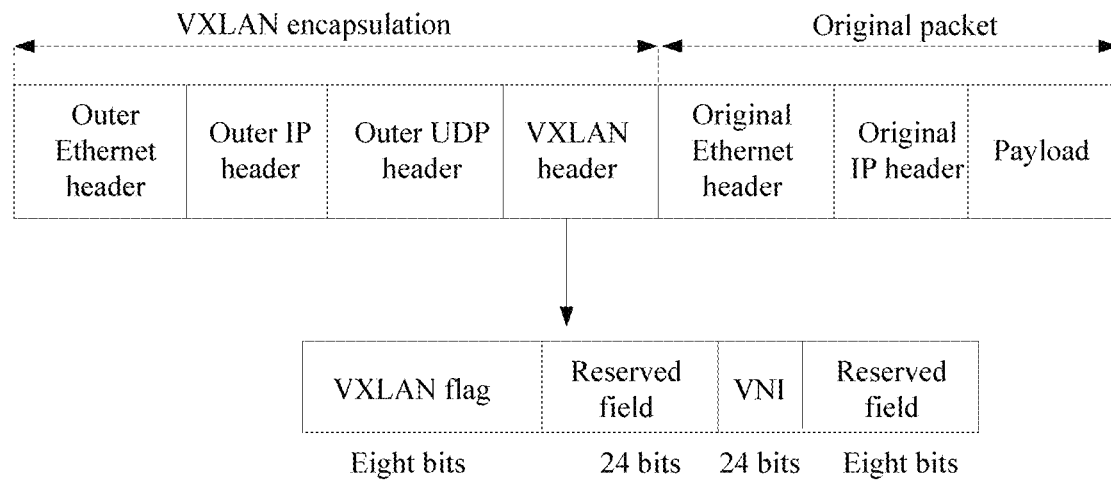
FIG. 6 is a schematic diagram of a VXLAN packet format in the prior art.

(6) VXLAN packet: Referring to FIG. 6, a VXLAN uses a MAC-in-UDP encapsulation manner: On a VTEP, a VXLAN header is added to an original packet (namely, an original Ethernet frame) sent by a virtual machine, and then the packet is encapsulated into a UDP header, and is encapsulated by using an IP/MAC address of a bearer network as an outer header. The VXLAN packet specifically includes the following:

Original packet: An original packet is located at an inner layer of the VXLAN packet. The original packet includes: an inner Ethernet header, where the inner Ethernet header includes an inner source MAC address and an inner destination MAC address; an inner IP header, where the inner IP header includes an inner source IP address and an inner destination IP address; a payload; and the like.

VXLAN header: A VXLAN network identifier (VNI) is introduced into a VXLAN header, and includes 24 bits. Each VNI can identify an independent network. The VNI may be used to support as much as 16 M of VXLAN segments, thereby satisfying a network identification requirement of a large quantity of tenants. In addition, the VXLAN header further includes a VXLAN flag field (eight bits, with a value of 00001000) and two reserved fields. Lengths of the two reserved fields are 24 bits and eight bits, respectively.

Outer UDP header: The VXLAN header and the original Ethernet frame are used together as UDP data. In an outer UDP header, a destination port number (namely a VXLAN port) is a protocol port, and a source port number (namely a UDP source port) is a value obtained by calculating the original Ethernet frame by using a hash algorithm.

Outer IP header: In an outer IP header, a source IP address (outer Src. IP) is an IP address of a VTEP to which a source VM belongs, and a destination IP address (outer Dst. IP) is an IP address of a VTEP to which a destination VM belongs.

Outer Ethernet header (Outer MAC Header): In an outer Ethernet header, a source MAC address (src. MAC addr.) is a MAC address of a VTEP to which a source VM belongs, and a destination MAC address (dst. MAC Addr.) is a MAC address of a next-hop device on a path to a destination VTEP.

(7) Header replication: A header replication list is configured in the VTEP. The header replication list records information about a peer VTEP (for example, IP, MAC, or the like of the peer VTEP) corresponding to a bridge domain BD). The VTEP may learn about, based on the header replication list, peer VTEPs belonging to a same BD or a same VNI, and these peer VTEPs determine a range of a same large layer 2 broadcast domain. When receiving the BUM packet, the VTEP traverses the header replication list, finds at least one peer VTEP that needs to receive the BUM packet, and sends the VXLAN-encapsulated BUM packet (namely a VXLAN packet) to the at least one VTEP one by one. For each peer VTEP, the VXLAN packet received by the peer VTEP is a unicast packet whose outer IP address points to the VTEP. All VXLAN packets mentioned in the following of the present disclosure are VXLAN-encapsulated BUM packets.

The following describes a BUM traffic control method according to an embodiment of the present disclosure.

Figure 7:
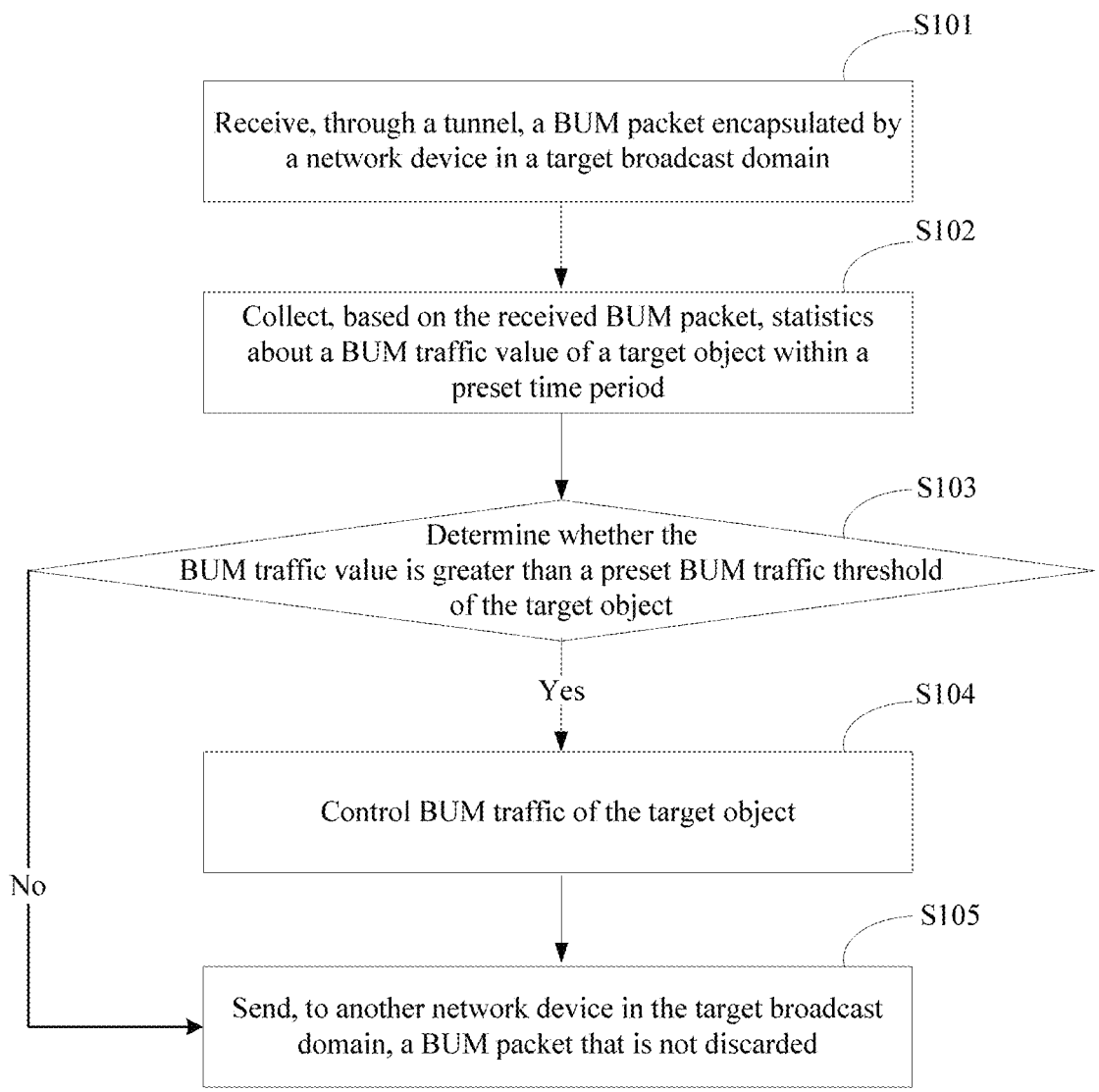
FIG. 7 is a BUM traffic control method according to an embodiment of the present disclosure.

Referring to FIG. 7, FIG. 7 is a BUM traffic control method according to an embodiment of the present disclosure. The method includes the following steps.

S101: A traffic controller receives, through a tunnel, a BUM packet encapsulated by a network device in a target broadcast domain.

When receiving the BUM packet, the network device in a communications network floods the BUM packet out through a port other than a receive port. For example, after receiving an unknown unicast frame, a multicast frame, and a broadcast frame, a layer 2 switch floods these frames through all ports in a same VLAN except a receive port.

In this embodiment of the present disclosure, to control BUM traffic and eliminate negative impact on the communications network caused by BUM packet flooding, the traffic controller is disposed in the communications network. After being configured, the traffic controller can receive the BUM packet encapsulated by the network device in the broadcast domain. Specifically, in the communications network in which a "tunnel" is used as a communication channel, for example, a VXLAN network, a GRE network, or a VPLS network, the traffic controller may receive, through a tunnel between the traffic controller and each network device in the target broadcast domain, a BUM packet forwarded by the network device. The target broadcast domain may be one broadcast domain, may be a collection of a plurality of broadcast domains, or may even be a collection of broadcast domains of the entire network. For example, in the VXLAN network, the target broadcast domain may be one BD; alternatively, the target broadcast domain may be a collection of a plurality of BDs (in this case, one traffic controller may process BUM traffic of one group of BDs), or may even be a collection of broadcast domains of the VXLAN network (for example, the collection of broadcast domains may cover an entire data center).

In the target broadcast domain, the traffic controller is used as a BUM packet forwarding hub. When the network device needs to send a BUM packet, the network device sends the BUM packet to the traffic controller. In a specific operation, the traffic controller and the network device that needs to send the BUM packet may be preconfigured.

In a specific embodiment, the network device is configured to send the BUM packet to the traffic controller. A member list is configured in the network device. The member list records an identifier of the traffic controller in the target broadcast domain. The network device sends the BUM packet to the traffic controller based on the member list. A configuration manner may be manual configuration, or may be automatic configuration.

For example, in the VXLAN network, in a process of configuring the member list for the network device, a source IP address of a VXLAN tunnel of the network device is manually or automatically configured as an IP address of a VTEP of the network device, and a destination IP address of the VXLAN tunnel of the network device is manually or automatically configured as an IP address of a VTEP of the traffic controller. When there are a plurality of traffic controllers, there are correspondingly a plurality of IP addresses of VTEPs provided by the traffic controllers. The network device may select, based on a BUM packet attribute or a broadcast domain (a VNI number), a corresponding traffic controller (or different interfaces of the traffic controller) to forward the BUM packet. In addition, the traffic controller may be manually configured as a centralized processing point of BUM packets in the target broadcast domain. Similarly, a member list is configured in the traffic controller. The member list records identifiers of the network devices in the target broadcast domain, and the identifier may be an IP address of a VTEP of the network device. The traffic controller receives, based on the identifier, the BUM packet sent by the corresponding network device. A BUM packet sent by a network device that is not in the member list is discarded.

After configuration on the network device and the traffic controller is completed, a VXLAN tunnel is established between the network device and the traffic controller. The network device sends the BUM packet to the traffic controller in the target broadcast domain based on the VXLAN tunnel. Correspondingly, the traffic controller receives, through the corresponding VXLAN tunnel, the BUM packet encapsulated by the network device in the target broadcast domain.

S102: The traffic controller collects, based on the received BUM packet, statistics about a BUM traffic amount of a target object within a preset time period.

In the VXLAN network, after the network device receives the BUM packet, the traffic controller collects statistics about traffic of all BUM packets received within the preset time period (for example, per second). The traffic statistics collection is collecting statistics about a quantity of VXLAN packets or a VXLAN packet length, to obtain a total quantity of VXLAN packets received within the preset time period (for example, per second).

Figure 8:
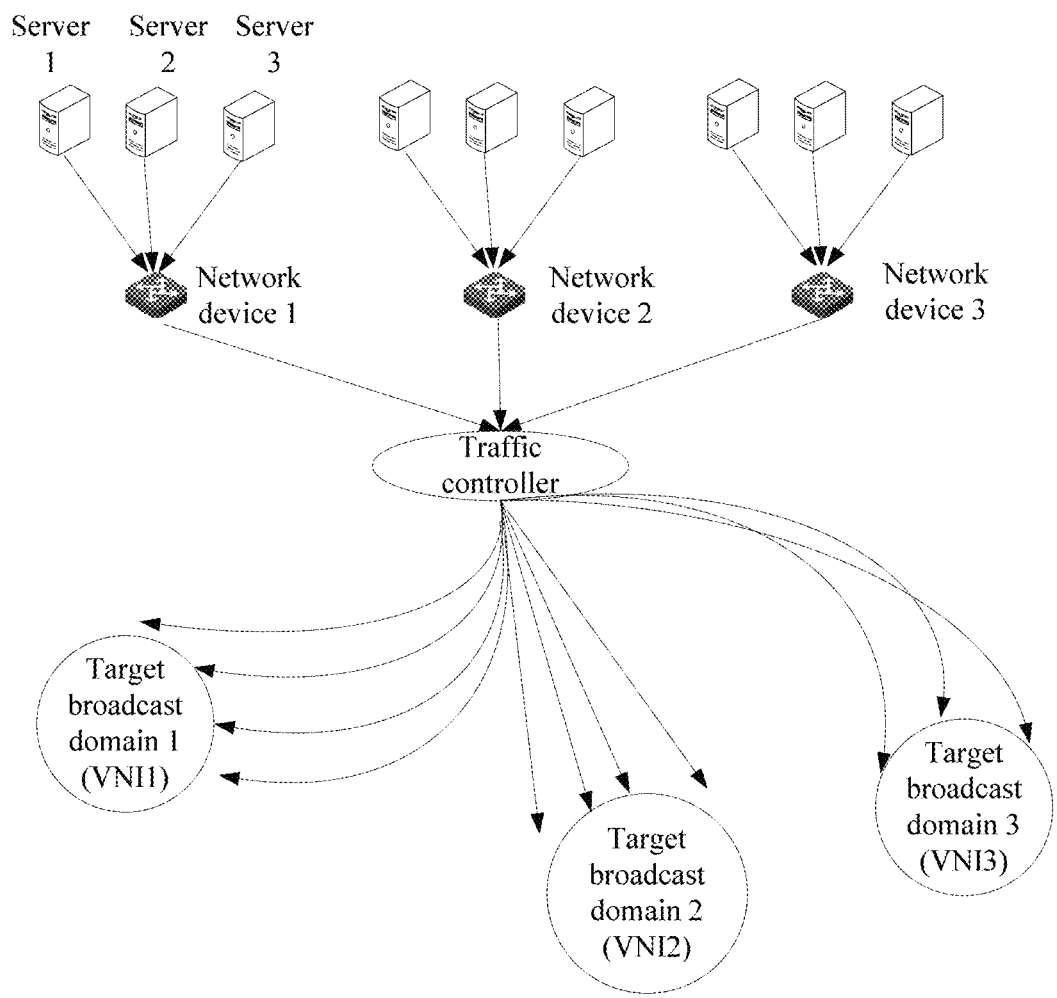
FIG. 8 is a schematic diagram of collecting statistics about BUM traffic by a traffic controller based on a target object according to an embodiment of the present disclosure.

The traffic controller may collect statistics about the BUM packet based on a plurality of dimensions. Referring to FIG. 8, the traffic controller may collect statistics about the BUM packet based on different target objects. The target object may be the target broadcast domain, the network device, or a host connected to the network device. Details are as follows:

In a specific implementation, the traffic controller collects statistics about a received BUM packet based on a VNI of a VXLAN packet, to obtain a total quantity of VXLAN packets that need to be sent to the target broadcast domain (or a BD corresponding to the VNI) within the preset time period (for example, per second). For example, in FIG. 8, after receiving BUM packets, the traffic controller collects statistics about a total quantity of BUM packets that need to be sent to each of target broadcast domains such as a target broadcast domain 1 (corresponding to a VNI1), a target broadcast domain 2 (corresponding to a VNI2), and a target broadcast domain 3 (corresponding to a VNI3).

In another specific implementation, the traffic controller collects statistics based on an IP address of a VTEP of the network device, to obtain a total quantity of VXLAN packets sent from the network device within the preset time period (for example, per second). For example, in FIG. 8, after receiving BUM packets, the traffic controller identifies network devices that respectively send these BUM packets, and collects statistics about a total quantity of BUM packets sent by each of these network devices (a network device 1, a network device 2, a network device 3, and the like) within the preset time period.

In a specific implementation, the traffic controller collects statistics based on an inner source MAC address or an inner source IP address (corresponding to a host) of a VXLAN packet, to obtain, a total quantity of original packets sent from the corresponding host within the preset time period (for example, per second). For example, in FIG. 8, after receiving BUM packets, the traffic controller identifies hosts (or VMs) that respectively send these BUM packets, and collects statistics about a total quantity of original packets sent by each of these hosts (a host 1, a host 2, a host 3, and the like) within the preset time period.

S103: The traffic controller determines whether the BUM traffic amount is greater than a preset BUM traffic threshold of the target object.

To achieve an objective of controlling BUM traffic by the traffic controller in the technical solutions of the present disclosure, after the traffic controller receives the BUM packet and collects the statistics about the BUM traffic amount, the traffic controller needs to determine whether the BUM traffic is beyond a limit. It can be understood that, that the BUM traffic is beyond a limit means that the BUM traffic amount is greater than the preset BUM traffic threshold of the target object, and that the BUM traffic is not beyond a limit means that the BUM traffic amount is not greater than the preset BUM traffic threshold of the target object. In a specific operation of this embodiment of the present disclosure, the statistics about the BUM traffic amount may be collected based on each of different dimensions (different target objects); therefore, corresponding traffic policies may be configured in the traffic controller based on the different dimensions (the different target objects). In the traffic policies, traffic thresholds within the preset time period (for example, per second) are preset for different target broadcast domains, different network devices, and different connected hosts. The traffic controller collects statistics about a BUM traffic amount of each target object according to step S102, and compares the BUM traffic amount with a corresponding preset BUM traffic threshold, to determine whether the BUM traffic amount of the target object is greater than the preset BUM traffic threshold of the target object.

For example, when the target object is the target broadcast domain, a traffic threshold of a target broadcast domain 1 within the preset time period is preset to A1, a traffic threshold of a target broadcast domain 2 within the preset time period is preset to A2, and a traffic threshold of a target broadcast domain 3 within the preset time period is preset to A3. In this case, after collecting statistics about BUM traffic amount, the traffic controller learns that a total quantity of VXLAN packets that need to be sent to the target broadcast domain 1 within the preset time period is A1*, a total quantity of VXLAN packets that need to be sent to the target broadcast domain 2 within the preset time period is A2*, and a total quantity of VXLAN packets that need to be sent to the target broadcast domain 3 within the preset time period is A3*. It can be understood that, by comparing A1 with A1*, comparing A2 with A2*, and comparing A3 with A3*, the traffic controller can determine a target broadcast domain whose BUM traffic amount is greater than a preset BUM traffic threshold of the target broadcast domain, and a target broadcast domain whose BUM traffic amount is less than a preset BUM traffic threshold of the target broadcast domain. If the BUM traffic amount is greater than the preset BUM traffic threshold, it indicates that the BUM traffic sent to the target broadcast domain is beyond a limit, and the traffic controller needs to perform subsequent control.

A processing process performed when the target object is a network device or a host connected to a network device is similar to the foregoing processing process for the target broadcast domain, and details are not described in the following again.

It should be noted that, in actual application of this embodiment of the present disclosure, the target object may be one of the target broadcast domain, a network device in the target broadcast domain, and a host connected to a network device in the target broadcast domain, or may be a combination of some thereof. For example, traffic statistics collection and determining may be performed based on a host use and quantity and a "VNI+network device+host" combination, or in another manner. A specific combination manner is not described herein. However, it should be noted that, regardless of how the combination manner changes, the change falls within the protection scope of the present disclosure.

S104: If the BUM traffic amount is greater than the preset BUM traffic threshold, the traffic controller controls BUM traffic of the target object, to reduce the BUM traffic of the target object.

By performing step S103, the traffic controller learns about, through BUM packet statistics collection and determining, a target object whose BUM traffic amount is beyond a limit and a target object whose BUM traffic amount is not beyond a limit. The BUM traffic amount beyond a limit may cause negative impact on the communications network. Therefore, the traffic controller controls the BUM traffic of the target object, to reduce the BUM traffic of the target object, thereby reducing and even eliminating the negative impact.

The controlling, by the traffic controller, BUM traffic of the target object includes: processing a BUM packet of the target object. A processing manner of the packet includes: discarding, recording a log, sending an alarm, redirecting to a specified port, or redirecting to a specified communication channel. The BUM packet of the target object is a BUM packet that should be sent to the target object when the traffic controller does not process the BUM packet (or when the BUM traffic amount of the target object is less than or equal to the preset BUM traffic threshold). The following describes each of the processing manners.

(1) Discarding: Because the BUM traffic amount of the target object exceeds the BUM traffic threshold, the traffic controller needs to limit the BUM traffic of the target object. The limiting the BUM traffic of the target object is limiting a quantity of BUM packets sent to the target object within the preset time period (for example, per second) or a length of a BUM packet sent to the target object within the preset time period. Specifically, a packet priority may be preset. The packet priority may be a level of a host that sends the packet. Host levels are classified based on functions of different hosts. For example, hosts are classified into a level-1 host, a level-2 host, a level-3 host, a level-4 host, and the like. The packet priority may alternatively be a level of a packet itself. For example, packets are classified into a level-1 packet, a level-2 packet, a level-3 packet, a level-4 packet, and the like. A higher priority indicates greater importance. A preset-level policy is set in the traffic controller. The preset-level policy indicates a priority type based on which a packet is discarded. The priority type may be a host level, may be a level of a packet itself, or may be a combination thereof.

For example, when the target object is the target broadcast domain, and the traffic controller determines that traffic of the target broadcast domain is beyond a limit, the traffic controller identifies, based on the preset-level policy, priorities of BUM packets of the target broadcast domain one by one. If finding that a BUM packet/some BUM packets has/have a priority lower than a preset level, the traffic controller discards the BUM packet/BUM packets.

A BUM packet discarding process performed when the target object is a network device or a host connected to a network device is similar to the foregoing processing process for the target broadcast domain, and details are not described in the following again.

It should be noted that the discarding includes no longer performing storage or forwarding. In addition, packet discarding may alternatively be implemented in another manner. For example, some BUM packets are sent to the traffic controller for a plurality of times within the preset time period (per unit time). In this case, the traffic controller may collect statistics about a quantity of repeated receptions of the packet within the preset time period (per unit time). If the quantity of repeated receptions is greater than a preset quantity of repeated receptions, the traffic controller discards the packet (discards some or all of the packets). It should be noted that a purpose of discarding the packet is to limit BUM traffic that is beyond a limit, and reduce impact on the communications network caused by the excessive BUM traffic. All implementations of packet discarding in a framework of the technical solutions of the present disclosure shall fall within the protection scope of the present disclosure.

(2) Recording a log: The recording a log is recording feature information of the BUM packet of the target object in a memory of the traffic controller when the BUM amount of the target object exceeds the preset BUM traffic threshold. The feature information may be a host (VM) related to the BUM packet, a network device related to the BUM packet, a packet protocol type, a packet reception time, and the like. The log is recorded for the BUM packet of the target object, so that a network manager (or a related user) views related information to determine which service/which host/which network device/which broadcast domain has a problem of excessive BUM traffic. It can be understood that, after discarding the packet, the traffic controller may also record the discarded BUM packet, so that the network manager (or the related user) learns about the discarding.

(3) Sending an alarm: Sending an alarm means that the traffic controller sends traffic alarm information to a network control unit when determining that the BUM traffic amount of the target object exceeds the preset BUM traffic threshold. The traffic alarm information is information used to indicate that the BUM traffic of the target object is beyond a limit, and the network control unit is a unit configured to control the BUM traffic. Specifically, in an embodiment, the network control unit is an independent server, and a monitoring platform or monitoring software runs in the server. When the traffic controller determines that the BUM traffic amount of the target object exceeds the preset BUM traffic threshold, the traffic controller sends the traffic alarm information to the independent server; in this case, a network manager (or a related user) can obtain traffic excessiveness information by using the monitoring platform or the monitoring software of the server, and perform corresponding processing in a timely manner. In another embodiment, the network control unit may be the network device that sends the BUM packet or the host connected to the network device. When the traffic controller determines that the BUM traffic amount of the target object exceeds the preset BUM traffic threshold, the traffic controller sends the traffic alarm information to the network device or the host, so that the network device or the host restrains a BUM packet sending behavior of the network device or the host. Specifically, a strategy of processing the traffic alarm information may be preconfigured in the network device or the host. In this case, when receiving the traffic alarm information sent by the traffic controller, the network device or the host restrains sending of a related BUM packet. This facilitates traffic control from a BUM packet source (the network device or the host).

(4) Redirecting to a specified port: A traffic analysis unit may be disposed in the traffic controller. The traffic analysis unit may be a traffic analysis platform that runs on a processor of the traffic controller, or may be another independent processor in the traffic controller. Either the traffic analysis platform or the independent processor is configured to deeply analyze a traffic excessiveness status, to obtain a comprehensive traffic control policy. For example, when the BUM traffic amount of the target object exceeds the preset BUM traffic threshold, the traffic controller sends the BUM traffic to the traffic analysis platform or the independent processor by using the specified port (some or all of the packets may be sent in a traffic replication manner). After receiving the BUM packet, the traffic analysis platform or the independent processor provides an optimum traffic processing solution (for example, instructing the traffic controller to control the BUM traffic) with reference to a current network status (for example, a current network structure and a congestion degree of current network bandwidth) and BUM traffic statistics.

(5) Redirecting to a specified communication channel: An independent traffic analysis server is disposed in the network. The traffic analysis server is configured to deeply analyze a traffic excessiveness status, to obtain a comprehensive traffic control policy. For example, when determining that the BUM traffic of the target object is beyond a limit, the traffic controller sends the BUM packet to the traffic analysis server through the communication channel (some or all of the packets may be sent in a traffic replication manner). For example, in a VXLAN network, the specified communication channel is a specified VXLAN tunnel. The traffic controller sends the BUM packet to the traffic analysis server through the specified VXLAN tunnel. After receiving the BUM packet, the traffic analysis server provides an optimum traffic processing solution (for example, instructing the traffic controller to control the BUM traffic) with reference to a current network status (for example, a current network structure and a congestion degree of current network bandwidth) and BUM traffic statistics. It should be noted that, in a specific embodiment, the traffic analysis server is the foregoing network control unit used as an independent server.

It can be understood that a processing manner of a BUM packet of the target object whose BUM traffic amount exceeds the preset BUM traffic threshold may be some or all of the foregoing listed processing manners. It can be further understood that this step mainly describes processing of the BUM packet of the target object whose BUM traffic amount exceeds the preset BUM traffic threshold. For a BUM packet of the target object whose BUM traffic amount does not exceed the preset BUM traffic threshold, the traffic controller does not perform the foregoing processing operation, and the traffic controller, as a traffic forwarding point, forwards the BUM packet after re-encapsulating the packet.

S105: Send, to another network device in the target broadcast domain, a BUM packet that is not discarded.

The traffic controller sends, to the another network device in the target broadcast domain, the BUM packet that is not discarded. The another network device is a network device that is in the target broadcast domain and that is different from a network device that sends, to the traffic controller, the BUM packet that is not discarded, and a source IP address of the BUM packet that is not discarded is an IP address of the network device that sends, to the traffic controller, the BUM packet that is not discarded.

Specifically, when the BUM traffic amount of the target object is greater than the preset BUM traffic threshold of the target object, after performing traffic control (processing), the traffic controller performs VXLAN re-encapsulation on a BUM packet left after control (processing) (the BUM packet that is not discarded), and then sends a re-encapsulated packet to the another network device in the target broadcast domain through a VXLAN tunnel.

Specifically, the traffic controller establishes a VXLAN tunnel with each of other network devices in the target broadcast domain based on a header replication list, and then sends, to each of the other network devices, the BUM packet that is not discarded. The BUM packet that is not discarded is some of the BUM packets received by the traffic controller.

For BUM traffic that is not beyond a limit, VXLAN re-encapsulation is also performed, and then a re-encapsulated packet is sent to the another network device in the target broadcast domain (that is, forwarded to the another network device in the target broadcast domain) through a VXLAN tunnel. In the re-encapsulated VXLAN packet, a source IP address is also still an IP address of the network device that sends the BUM packet.

For ease of understanding a packet re-encapsulation and conversion process in this embodiment of the present disclosure, the following uses an example of a specific application scenario.

Figure 9:
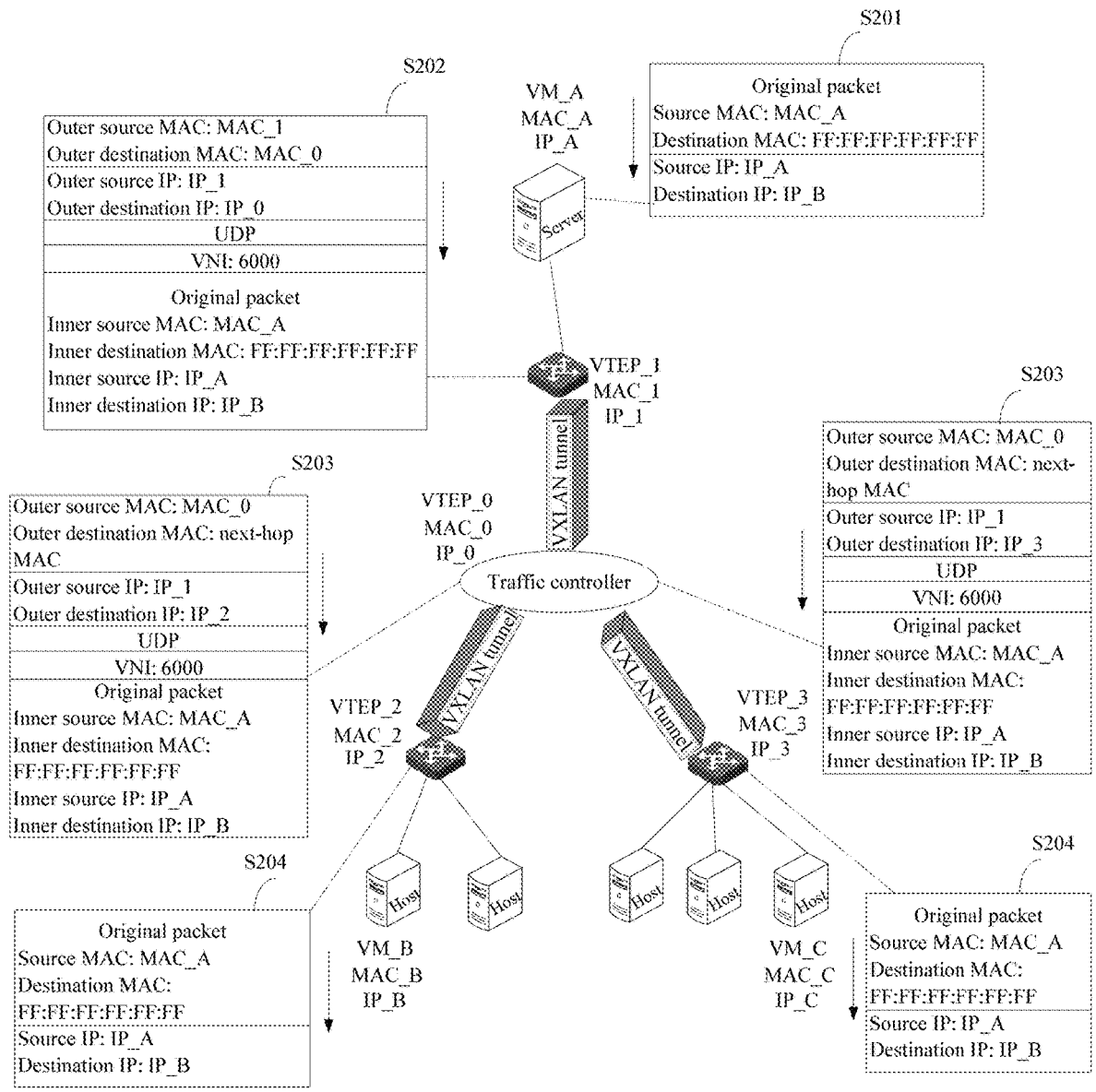
FIG. 9 is a schematic diagram of VXLAN packet forwarding and format change according to an embodiment of the present disclosure.

Referring to FIG. 9, in a communications network, a VM_A, a VM_B, and a VM_C all belong to a 10.1.1.0/24 network segment, and belong to a VNI 6000. The VM_A is located in a server connected to a network device VTEP_1, the VM_B is located in a server connected to a network device VTEP_2, and the VM_C is located in a server connected to a network device VTEP_3. In this case, the VM_A expects to communicate with the VM_B. If communication is to be performed for the first time, the VM_A does not have a MAC address of the VM_B. Therefore, the VM_A sends an ARP broadcast packet to request the MAC address of the VM_B. The following describes, based on a forwarding process of the broadcast packet, a BUM packet conversion and propagation process performed after the traffic controller is introduced into the communications network. For the process, refer to the following steps.

S201: The VM_A sends, to the VTEP_1, an original ARP broadcast packet whose source MAC address is MAC_A, destination MAC address is all-F, source IP address is IP_A, and destination IP address is IP_B, to request the MAC address of the VM_B.

S202: After receiving the BUM packet (ARP request), the VTEP_1 may determine, based on a port through which the packet is received and VLAN information carried in the packet, a layer 2 broadcast domain (namely a BD) to which the packet belongs, and the VTEP_1 identifies a VNI (for example, a VNI 6000) to which the broadcast packet belongs. Based on a related configuration in this embodiment of the present disclosure, the VTEP_1 needs to send a BUM packet to the traffic controller. Therefore, the VTEP_1 traverses a member list to obtain tunnel information of the traffic controller (a VTEP_0 of the traffic controller), and encapsulates the original packet into a VXLAN packet based on the information. An outer source IP address of the VXLAN packet is an IP address of the VTEP_1 (IP_1). An outer destination IP address of the VXLAN packet is an IP address of the VTEP_0 of the traffic controller (IP_0). An outer source MAC address of the VXLAN packet is a MAC address of the VTEP_1 (MAC_1). An outer destination MAC address of the VXLAN packet is a MAC address of the VTEP_0 of the traffic controller (MAC_0). The VXLAN packet is transmitted in an IP network based on the outer MAC addresses and the IP addresses, until arriving at the VTEP_0 of the traffic controller.

S203: After receiving the VXLAN packet, the traffic controller identifies a VNI (VNI 6000) to which the broadcast packet belongs, searches the header replication list, finds that peer VTEPs in the VNI 6000 include only the VTEP_2 and the VTEP_3, and therefore performs broadcast packet header replication based on the VTEP_2 and the VTEP_3 separately. In re-encapsulated VXLAN packets: for a VXLAN packet sent to the VTEP_2, an outer source IP address is still the IP address of the VTEP_1, an outer destination IP address is an IP address of the VTEP_2, an outer source MAC address is the MAC address of the VTEP_0, and an outer destination MAC address is a MAC address of a next-hop device; and the VXLAN packet is transmitted in the IP network based on the outer MAC addresses and the IP addresses, until arriving at the VTEP_2; and for a VXLAN packet sent to the VTEP_3, an outer source IP address is still the IP address of the VTEP_1, an outer destination IP address is an IP address of the VTEP_3, an outer source MAC address is the MAC address of the VTEP_0, and an outer destination MAC address is a MAC address of a next-hop device; and the VXLAN packet is transmitted in the IP network based on the outer MAC addresses and the IP addresses, until arriving at the VTEP_3.

S204: Respectively perform the following processing processes after the packets arrive at the VTEP_2 and the VTEP_3:

After the VXLAN packet arrives at the VTEP_2, the VTEP_2 decapsulates the VXLAN packet, to obtain the original packet sent by the VM_A. Then, after performing corresponding processing on the packet based on a configuration on a layer 2 sub-interface of the VTEP_2, the VTEP_2 broadcasts the original packet to a connected host in a corresponding layer 2 broadcast domain. After receiving the original packet, the VM_B compares the destination IP address in the original packet to find that the destination IP address is an IP address of the VM_B, and answers the ARP request.

After the VXLAN packet arrives at the VTEP_3, the VTEP_3 decapsulates the VXLAN packet, to obtain the original packet sent by the VX_A. Then, after performing corresponding processing on the packet based on a configuration on a layer 2 sub-interface of the VTEP_3, the VTEP_3 broadcasts the original packet to a connected host in a corresponding layer 2 broadcast domain. After any host in the layer 2 broadcast domain, for example, the VM_C, receives the original packet, the VM_C compares the destination IP address in the original packet to find that the destination IP address is not an IP address of the VM_C, and therefore discards the original packet.

From the foregoing process, it can be learned that, in the VXLAN network, in the BUM packet sent to the target broadcast domain by the traffic controller, in VXLAN encapsulation, an outer destination MAC address is replaced with a MAC address of a VTEP of a next-hop device, an outer source MAC address is replaced with a MAC address of a VTEP of the traffic controller, and an outer destination IP address is replaced with an IP address of a VTEP of another network device. However, a source IP address remains unchanged. the source IP address is still the IP address of the VTEP of the network device. The original packet also remains unchanged. It should be noted that the foregoing ARP packet broadcast process is merely intended to describe a BUM packet transmission process and a packet change caused by re-encapsulation in an embodiment, and should not be construed as a limitation on the present disclosure.

In this embodiment of the present disclosure, a purpose of keeping the source IP address as the IP address of the network device (the network device that sends the BUM packet) is as follows: When the network device corresponding to the outer destination IP (the another network device) receives the packet, because the source IP address is identified as the IP address of the network device (the network device that sends the BUM packet), it is considered by default that the packet is sent by the network device (the network device that sends the BUM packet). In other words, the another network device that receives the BUM packet is unaware of existence of the traffic controller used as a centralized processing point of traffic. Therefore, after the traffic controller is introduced into an existing communications network, normal communication identification of the existing communications network is not affected. This facilitates application of the technical solutions of this embodiment of the present disclosure to the existing communications network.

It can be learned that, through implementation of the technical solutions in this embodiment of the present disclosure, after the traffic controller is introduced into the communications network, the traffic controller may receive the BUM packet encapsulated by the network device in the target broadcast domain, and collect traffic statistics; when finding that the BUM traffic amount of the target object in the target broadcast domain is greater than the preset BUM traffic threshold, the traffic controller controls the BUM traffic of the target object (the target broadcast domain, the network device, the host, or the like), to reduce the BUM traffic of the target object. This implements effective control on BUM traffic. The another network device that receives the BUM packet is unaware of existence of the traffic controller used as the centralized processing point of traffic. Therefore, after the traffic controller is introduced into the existing communications network, normal communication identification of the existing communications network is not affected. Therefore, a new communications network system provided in this embodiment of this application may be a brand-new communications system, or may be an improved solution made based on the existing communications network.

Figure 10:
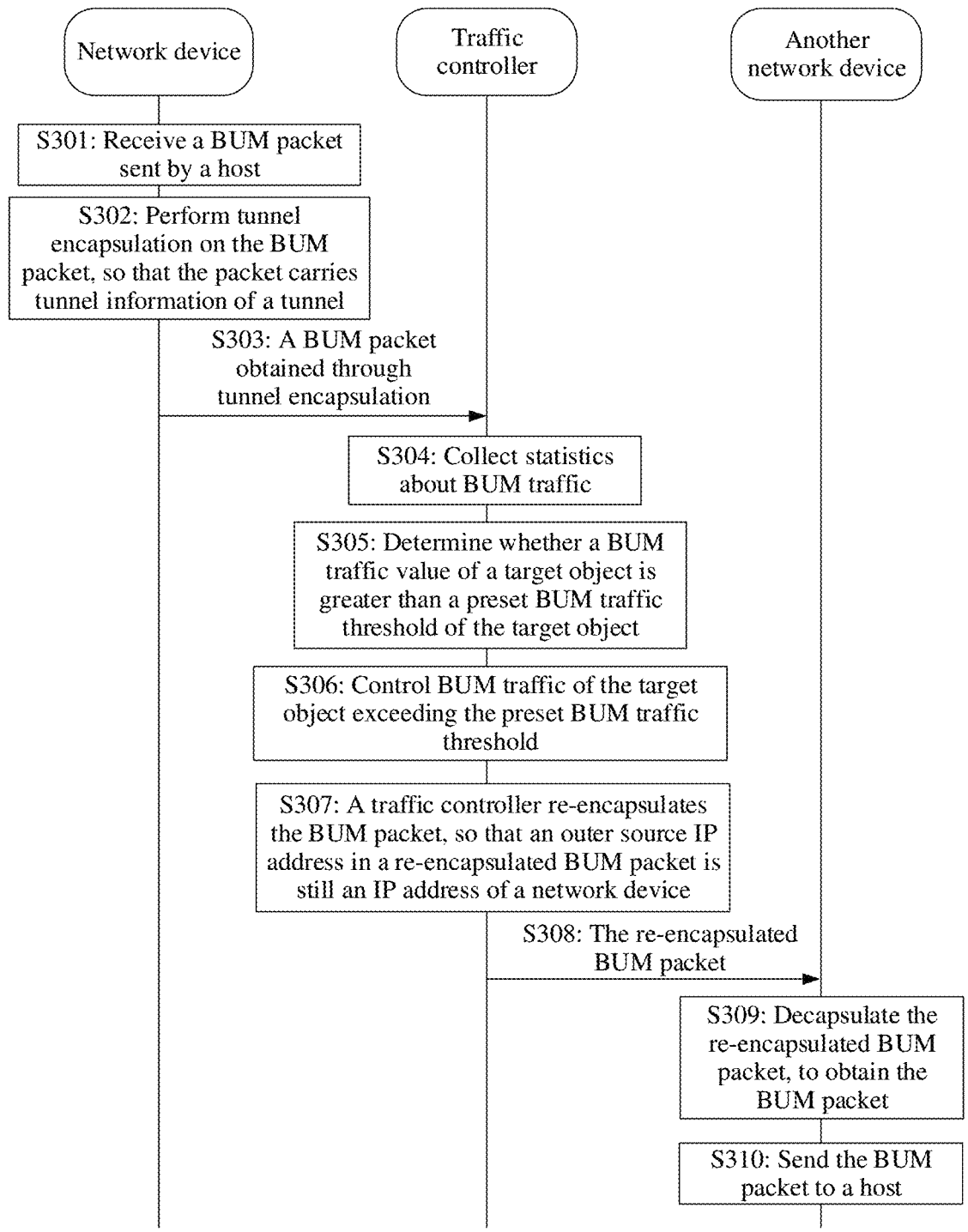
FIG. 10 is another BUM traffic control method according to an embodiment of the present disclosure.

The following describes another BUM traffic control method according to an embodiment of the present disclosure, and describes the method from a plurality of sides. Referring to FIG. 10, FIG. 10 is the another BUM traffic control method according to this embodiment of the present disclosure. As shown in FIG. 10, the BUM traffic control method according to this embodiment of the present disclosure includes the following steps.

S301: A network device receives a BUM packet sent by the host.

The network device may be a switch (for example, a layer 2 switch or a layer 3 switch), and is used for forwarding or routing in a communications network. In a specific application scenario, the network device has a plurality of representation forms. For example, in a "spine-leaf" network architecture of a data center, the network device may be a spine device or a leaf device; in a "layer 2-Layer 3" architecture, the network device may be an access-layer switch, an aggregation-layer switch, or a core-layer switch. The host is a host connected to the network device, and the host sends or receives data by using the network device. The host sends a BUM packet depending on a requirement of the host, where the BUM packet is a packet on which tunnel encapsulation is not performed. For example, when the host expects to access another host in a same subnet, if the host finds no corresponding ARP table, the host needs to send an ARP broadcast packet, to query for MAC address information corresponding to an IP of a specified host.

The host sends the BUM packet, and correspondingly, the network device receives the BUM packet. In this case, the network device first performs VLAN check on the BUM packet. The VLAN check is checking whether a VLAN to which the packet belongs is the same as a VLAN to which an input port belongs. If the VLAN to which the packet belongs is different from the VLAN to which the input port belongs, the network device discards the packet. If the VLAN to which the packet belongs is the same as the VLAN to which the input port belongs, the network device retains the packet. Then, the network device performs Multiple Spanning Tree Protocol (MSTP) check on the BUM packet. The MSTP check is mapping to a corresponding MSTP instance based on the VLAN to which the packet belongs, and querying for a status of the corresponding MSTP instance on the port. If the status is not a forwarding status, the network device discards the packet. If the status is a forwarding status, the network device retains the packet.

S302: The network device performs tunnel encapsulation on the BUM packet, so that the packet carries tunnel information of a tunnel.

Usually, the BUM packet that passes VLAN check and MSTP check is flooded out through a port other than a receive port. After receiving an unknown unicast frame, a multicast frame, and a broadcast frame, some layer 2 devices (for example, layer 2 switches) flood these frames through all ports in a same VLAN except a receive port. After receiving an unknown unicast frame, a multicast frame, and a broadcast frame, some Layer 3 devices (for example, routing devices or Layer 3 switches) may further flood these frames through ports in different VLANs except a receive port.

In an application scenario, such as a data center, to satisfy a cloud computing requirement, a network architecture with a "tunnel" solution is usually used for data communication. In such a scenario, before BUM packet flooding, corresponding tunnel encapsulation needs to be performed depending on a tunnel requirement. For example, in a VXLAN network, VXLAN encapsulation needs to be performed.

In other words, in a VXLAN network, the network device needs to perform tunnel encapsulation on the BUM packet, so that the packet carries the tunnel information of the tunnel. The tunnel information includes information, such as an IP address or a MAC address, about VTEPs at two ends of the tunnel. In this case, the network device is used as a VTEP at a local end of the tunnel. A VXLAN-encapsulated packet is a VXLAN packet. In the VXLAN packet, a source IP is an IP of the VTEP of the network device (or an IP of the VTEP of the network device), a destination IP is an IP of a VTEP of a peer network device (in this embodiment of the present disclosure, the peer network device in this case is a traffic controller), and a VNI is a broadcast domain to which the host belongs. An inner original packet of the VXLAN packet is the BUM packet sent from the host.

S303: The network device sends, to a traffic controller based on the tunnel information through the tunnel, a BUM packet obtained through tunnel encapsulation.

It should be noted that, in this embodiment of the present disclosure, the BUM packet obtained through tunnel encapsulation is the foregoing encapsulated BUM packet.

To control the BUM packet and eliminate negative impact on the communications network caused by BUM packet flooding, the traffic controller is disposed in the communications network. After being configured, the traffic controller can receive the BUM packet encapsulated by the network device in the broadcast domain. Specifically, in the communications network in which a "tunnel" is used as a communication channel, for example, the VXLAN network, a GRE (NVGRE) network, or a VPLS network, the traffic controller may receive, through the tunnel, the BUM packet encapsulated by the network device in the target broadcast domain.

The traffic controller is a device that can receive the BUM packet encapsulated by the network device in the target broadcast domain and that can perform statistics collection, determining, and control on BUM traffic of the target object to reduce the BUM packets. The target object may be one or a combination of more than one of the target broadcast domain, the network device, and the host connected to the network device.

after being configured, the network device sends an encapsulated BUM packet to the traffic controller whenever the network device needs to forward the encapsulated BUM packet. After being configured, the traffic controller is used as a centralized processing point of traffic, and processes a BUM packet in the broadcast domain.

In a specific embodiment, the traffic controller may be an independent dedicated network device (a layer 2 device, a Layer 3 device, or the like) or a host, or may be a switch or router with a relatively strong forwarding capability. In the communications network, there may be one or more traffic controllers. When there is one traffic controller, the one traffic controller may manage BUM traffic in different broadcast domains. When a network scale is expanded or a BUM traffic processing capacity of a single traffic controller is insufficient, there may be a plurality of traffic controllers. A different or same traffic controller may be specified for each broadcast domain, and different traffic controllers may assist each other in controlling BUM traffic. Different traffic controllers may also respectively manage different broadcast domains (be respectively corresponding to different VNIs).

Specifically, in the VXLAN network, the encapsulated BUM packet is a VXLAN packet. The network device sends the VXLAN packet to the traffic controller based on the tunnel information through a VXLAN tunnel. Correspondingly, the traffic controller receives the VXLAN packet. Then, the traffic controller first checks validity of outer tunnel information of the VXLAN packet, including validity of an outer destination IP, an outer source IP, and a UDP protocol destination port. An invalid VXLAN packet is directly discarded (the invalid VXLAN packet is, for example, a VXLAN packet with a masqueraded outer IP), and a valid VXLAN packet is retained.

S304: The traffic controller collects statistics about the BUM traffic.

The traffic controller extracts a VNI and a destination MAC address of an inner original packet from a retained VXLAN packet, and identifies a layer 2 broadcast domain (or a multicast group) to which the VXLAN packet belongs. To achieve an objective of implementing BUM traffic control in this embodiment of the present disclosure, the traffic controller collects statistics about the BUM traffic to obtain a BUM traffic amount.

Specifically, the traffic controller collects statistics about all BUM packets received within a preset time period (for example, per second). The statistics collection is collecting statistics about a quantity of VXLAN packets or a VXLAN packet length, to obtain, a total quantity of VXLAN packets received within the preset time period (for example, per second).

The traffic controller may collect statistics about the BUM packet based on a plurality of dimensions. For example, the traffic controller may collect statistics about the BUM packet based on different target objects. The target object may be the target broadcast domain, the network device, or the host connected to the network device (for details, refer to description of the embodiment in FIG. 8).

S305: The traffic controller determines whether the BUM traffic amount is greater than a preset BUM traffic threshold of the target object.

To achieve an objective of controlling the BUM traffic by the traffic controller in this embodiment of the present disclosure, the traffic controller needs to determine whether the BUM traffic amount is beyond a limit. The statistics about the BUM traffic may be collected based on each of different dimensions (different target objects); therefore, corresponding traffic policies may be configured in the traffic controller based on the different dimensions (the different target objects). In the traffic policies, traffic thresholds within the preset time period (for example, per second) are preset for different target broadcast domains, different network devices, and different hosts. The traffic controller collects statistics about a BUM traffic amount of each target object, and compares the BUM traffic amount with a corresponding preset BUM traffic threshold to determine whether the BUM traffic amount of the target object is greater than the preset BUM traffic threshold of the target object (refer to description in step S103 of the embodiment in FIG. 7).

In actual application of this embodiment of the present disclosure, a used traffic policy may be a combination of implementations for different target objects. the target object may be one or a combination of more than one of the target broadcast domain, the network device, and the host connected to the network device. For example, traffic statistics collection and determining may be performed based on a host use and quantity and a "VNI+network device+host" combination, or in another manner. A specific combination manner is not described herein. However, it should be noted that, regardless of how the combination manner changes, the change falls within the protection scope of the present disclosure.

S306: The traffic controller controls BUM traffic of the target object exceeding the preset BUM traffic threshold.

The controlling, by the traffic controller, BUM traffic includes: processing a BUM packet of the target object, where a processing manner of the packet includes: discarding the packet, recording a log, sending an alarm, redirecting to a specified port, or redirecting to a specified communication channel (for details, refer to description in step S104 of the embodiment in FIG. 7).

It can be understood that a processing manner of a BUM packet that exceeds the preset BUM traffic threshold may be some or all of the foregoing listed processing manners. In addition to the foregoing listed processing manners, there may further be diverse manners of processing the BUM packet that is beyond a limit. Details are not described herein. All changes and variations of the manners of processing the BUM packet that is beyond a limit shall fall within the protection scope of the present disclosure.

It can be further understood that the traffic controller does not perform the foregoing processing operation on a BUM packet that is not beyond a limit (a BUM packet that is less than or equal to the preset BUM traffic threshold).

S307: The traffic controller re-encapsulates the BUM packet, so that an outer source IP address in a re-encapsulated BUM packet is still an IP address of the network device.

To meet a requirement of sending the BUM packet to another network device in the target broadcast domain through a tunnel, the traffic controller re-encapsulates the BUM packet, so that the outer source IP address in the BUM packet is still the IP address of the network device (that is, the network device that sends the BUM packet to the traffic controller in the foregoing step). In addition, an outer destination IP address, an outer source MAC address, an outer destination MAC address, and the like need to be correspondingly replaced, an inner original packet of the packet remains unchanged, and a CRC of the entire packet is recalculated.

Specifically, in the VXLAN network, in a re-encapsulated VXLAN packet, an outer destination MAC address is replaced with a MAC address of a VTEP of a next-hop device, an outer source MAC address is replaced with a MAC address of a VTEP of the traffic controller, and an outer destination IP address is replaced with an IP address of a VTEP of the another network device. However, a source IP address is still the IP address of the VTEP of the VTEP of the network device, the original packet remains unchanged, another field of the packet also remains unchanged, and a CRC of the entire packet is recalculated.

In this embodiment of the present disclosure, a purpose of keeping the source IP address as the IP address of the network device (the network device that sends the BUM packet) is as follows: When the network device corresponding to the outer destination IP (the another network device) receives the packet (the re-encapsulated BUM packet), because the source IP address is identified as the IP address of the network device (the network device that sends the BUM packet), it is considered by default that the packet is sent by the network device (the network device that sends the BUM packet). In other words, the another network device is unaware of existence of the traffic controller used as the centralized processing point of traffic. Therefore, after the traffic controller is introduced into an existing communications network, normal communication identification of the existing communications network is not affected. This facilitates application of the technical solutions of this embodiment of the present disclosure to the existing communications network.

S308: The traffic controller sends the re-encapsulated BUM packet to another network device in the target broadcast domain.

In the VXLAN network, the traffic controller sends the re-encapsulated BUM packet to the another network device in the target broadcast domain through a VXLAN tunnel. Therefore, the traffic controller needs to establish a VXLAN tunnel with a VTEP of each of other network devices in the target broadcast domain. Specifically, the traffic controller establishes the VXLAN tunnel with the another network device based on a header replication list.

The header replication list records a peer VTEP corresponding to a BD. Therefore, based on the header replication list, the traffic controller can learn about VTEPs of other network devices belonging to a same BD (a same VNI), learn about a range of the target broadcast domain, and the traffic controller can also learn about an IP, MAC, or the like of a next-hop device through which the re-encapsulated BUM packet is sent to a VTEP of the another network device. In a process of sending the re-encapsulated BUM packet, the traffic controller establishes a VXLAN tunnel between a local VTEP and the VTEP of the another network device, and sends the packet in a header replication manner to VTEPs of all other network devices in the target broadcast domain. For example, for a broadcast packet or an unknown unicast packet, the traffic controller traverses all other network devices in the header replication list that are in a layer 2 broadcast domain to which the packet belongs, and replicates and sends the packet to a VTEP of each of the other network devices. For another example, for a multicast packet, the traffic controller may re-encapsulate the packet into a new multicast-dedicated tunnel, and send a re-encapsulated packet to a VTEP of each of other network devices in the layer 2 broadcast domain based on a multicast tree.

It can be understood that, when some re-encapsulated BUM packets need to be transmitted across different BDs, the traffic controller may also send these packets to VTEPs of all other network devices in different layer 2 broadcast domains.

For a BUM packet that exceeds the preset BUM traffic threshold, after performing traffic control (processing), the traffic controller performs VXLAN re-encapsulation on a BUM packet left after control (processing), and then sends a re-encapsulated packet to the another network device in the target broadcast domain through the VXLAN tunnel. In the re-encapsulated VXLAN packet, a source IP address is still the IP address of the network device that sends the BUM packet.

For a BUM packet that is not beyond a limit, VXLAN re-encapsulation is also performed, and then a re-encapsulated packet is sent to the another network device in the target broadcast domain through the VXLAN tunnel. In the re-encapsulated VXLAN packet, a source IP address is also still the IP address of the network device that sends the BUM packet.

In the VXLAN network, for a local ARP request broadcast packet, if an ARP table of the traffic controller includes no corresponding information, the traffic controller continues to broadcast the ARP packet. If an ARP table of the traffic controller includes corresponding information, the traffic controller does not broadcast the ARP packet, but directly answers (refer to description in step S105 of the embodiment in FIG. 7).

S309: The another network device decapsulates the re-encapsulated BUM packet, to obtain the BUM packet.

Specifically, after the VTEP of the another network device receives the re-encapsulated VXLAN packet in the specified layer 2 broadcast domain, the another network device first checks validity of outer tunnel information of the VXLAN packet, including validity of an outer destination IP, an outer source IP, and a UDP protocol destination port. An invalid VXLAN packet is directly discarded (for example, a VXLAN packet with a masqueraded outer IP is discarded), and a valid VXLAN packet is retained. Then, the another network device performs VXLAN decapsulation to obtain the BUM packet. The another network device may identify, by using related encapsulation information (not limited to a VNI), a layer 2 broadcast domain to which the BUM packet belongs.

S310: The another network device sends, in the layer 2 domain, the BUM packet to a host connected to the another network device.

The another network device is also connected to a host. Therefore, the another network device traverses interfaces of all hosts in the layer 2 broadcast domain to which the original packet belongs, and sends the BUM packet to each host managed by the another network device.

It can be learned that, according to the solutions in this embodiment of the present disclosure, when the host in the communications network needs to send the BUM packet to another host by using the network device, the network device only needs to perform tunnel encapsulation on the BUM packet, and send the encapsulated BUM packet to the traffic controller. The traffic controller receives the encapsulated BUM packet, collects statistics about the BUM traffic amount of the target object, and determines whether the BUM traffic is beyond a limit. If the BUM traffic is beyond a limit, the traffic controller controls the BUM traffic that is beyond a limit, and sends the re-encapsulated BUM packet to the another network device in the target broadcast domain after performing control. The another network device decapsulates the re-encapsulated BUM packet after receiving the re-encapsulated BUM packet, and forwards the obtained BUM packet to the host in the corresponding broadcast domain. In other words, after the traffic controller is introduced, BUM packet control can be implemented in three dimensions: the broadcast domain, the network device, and the host, so as to control BUM traffic in the broadcast domain, the network device, and the host to be within a proper range. This effectively resolves a problem that BUM traffic sharply increases after a quantity of network devices or a quantity of hosts increases, and further avoids a problem that large BUM traffic occupies network bandwidth and consumes a server CPU. In addition, in this process, the network device does not need to traverse all members in a header replication list corresponding to the target broadcast domain, but only needs to configure a member list including an identifier of the traffic controller; and the network device only needs to send the BUM packet to the traffic controller based on the member list. Therefore, the network device does not need to configure a BUM packet forwarding policy for the another network device in the target broadcast domain. This can effectively reduce load of the network device.

Figure 11:
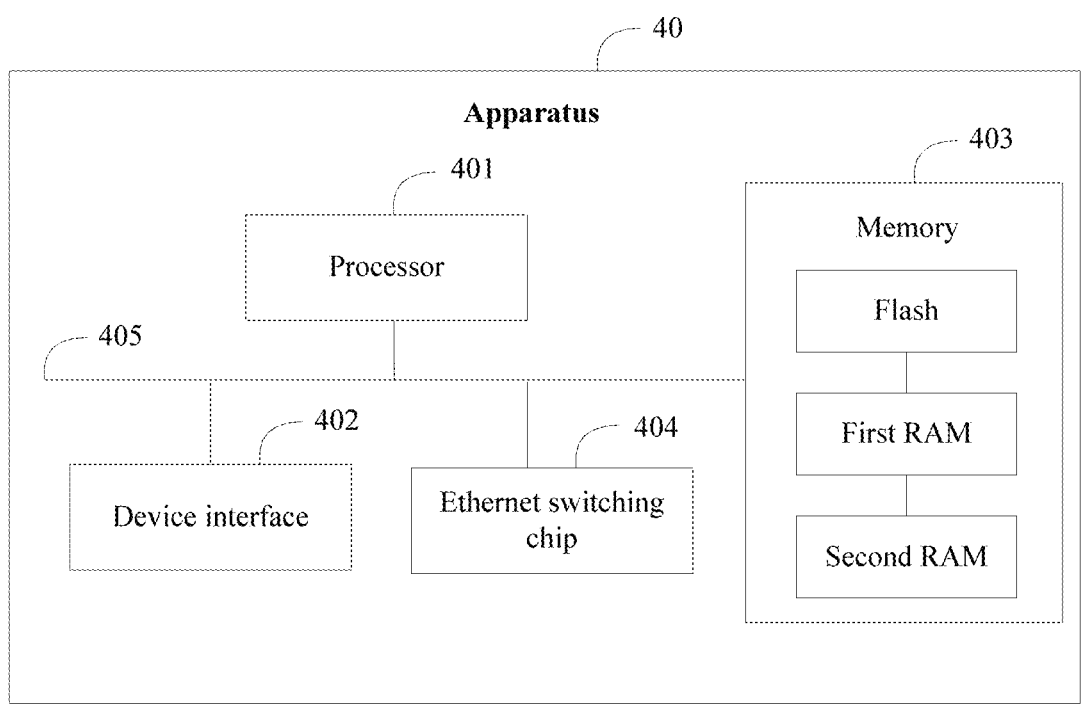
FIG. 11 is a schematic structural diagram of an apparatus according to an embodiment of the present disclosure.

Based on a same disclosure idea, an embodiment of the present disclosure further provides an apparatus 40. Referring to FIG. 11, the apparatus 40 is configured to implement the method described in the embodiment in FIG. 7 or FIG. 10.

As shown in FIG. 11, the apparatus 40 includes at least one processor 401, a device interface 402, a memory 403, and an Ethernet switching chip 404. The processor 401, the device interface 402, the memory 403, and the Ethernet switching chip 404 may be connected by using a bus or in another manner. An example in which a connection is implemented by using a bus 405 is used in this embodiment of the present disclosure.

The processor 401 may be a general purpose processor, for example, a central processing unit (CPU).

The device interface 402 may be a wired interface, for example, an Ethernet interface, and is configured to communicate with another device.

The memory 403 may include a volatile memory, for example, a random access memory (RAM). The memory 403 may alternatively include a non-volatile memory, for example, a read-only memory (ROM), a flash memory, a hard disk drive (HDD), or a solid-state drive (SSD). The memory 403 may alternatively include a combination of memories of the foregoing types. In this embodiment of the present disclosure, the memory 403 includes at least a flash and a RAM. The RAM is a combination of a first RAM and a second RAM. The flash is configured to store a group of program code and a static configuration parameter (a member list, a header replication list, an ARP table, or the like). The first RAM is configured to store code and data that are executed during program running. The second RAM is configured to store a packet that needs to be forwarded (sent).

The Ethernet switching chip 404 may be configured to perform, under control of the processor 401, initialization, service entry delivering, protocol packet accepting and sending, packet validity check, packet management, various interrupts (including port link up and link down processing), and the like. The processor 401 is configured to invoke the program code stored in the memory 403, and control running of the Ethernet switching chip 404.

When the apparatus 40 is a traffic controller, the program code stored in the memory 403 is specifically configured to implement a function of the traffic controller in the embodiment in FIG. 10, and may be further configured to implement a function of the traffic controller in the embodiment in FIG. 7.

When the apparatus 40 is a network device, the program code stored in the memory 403 is specifically configured to implement a function of the network device in the embodiment in FIG. 10, and may be further configured to implement a function of the network device in the embodiment in FIG. 7.

Figure 12:
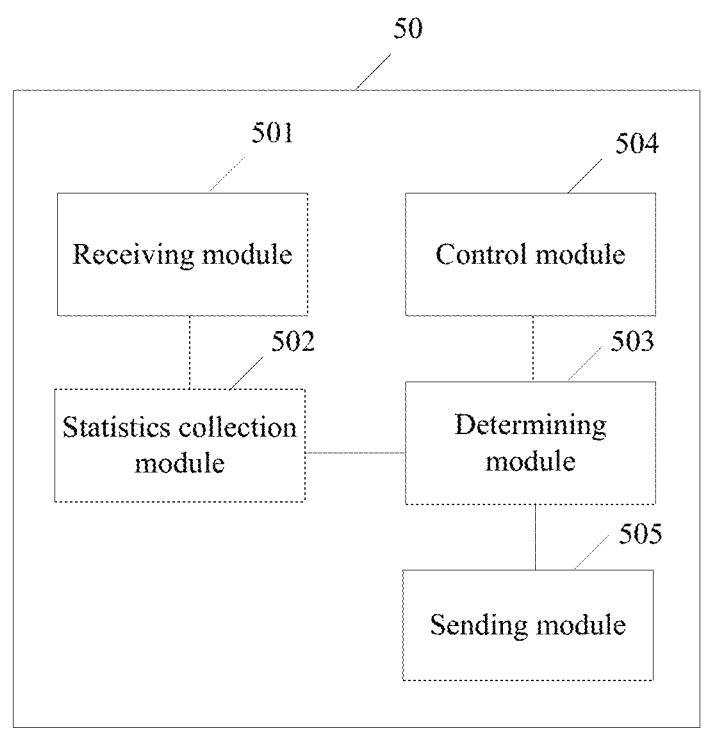
FIG. 12 is a schematic structural diagram of a traffic controller according to an embodiment of the present disclosure.
Figure 13:
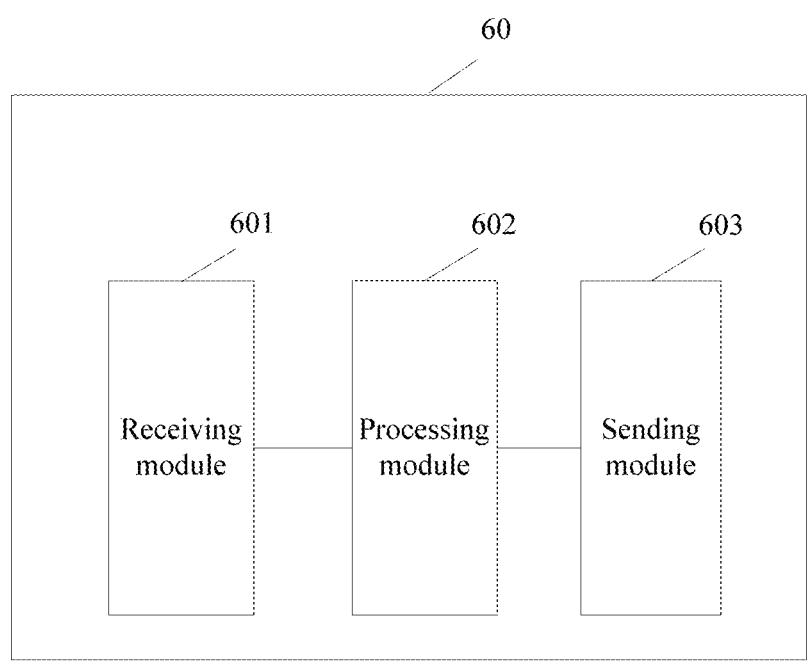
FIG. 13 is a schematic structural diagram of a network device according to an embodiment of the present disclosure.

Based on a same disclosure idea, an embodiment of the present disclosure further provides a traffic controller 50 (as shown in FIG. 12) and a network device 6o (as shown in FIG. 13) that are configured to execute the BUM traffic control method described in the embodiment in FIG. 7 or FIG. 10.

As shown in FIG. 12, the traffic controller 50 may include a receiving module 501, a statistics collection module 502, a determining module 503, a control module 504, and a sending module 505.

The receiving module 501 is configured to receive, through the tunnel, a BUM packet encapsulated by one or more network devices in the target broadcast domain.

The statistics collection module 502 is configured to collect, based on the received BUM packet, statistics about a BUM traffic amount of a target object within a preset time period. The target object is the target broadcast domain, a network device in the target broadcast domain, or a host connected to a network device in the target broadcast domain.

The determining module 503 is configured to determine whether the BUM traffic amount is greater than a preset BUM traffic threshold of the target object.

When the determining module 503 determines that the BUM traffic amount of the target object is greater than the preset BUM traffic threshold of the target object, the control module 504 is configured to control BUM traffic of the target object, to reduce the BUM traffic of the target object.

The sending module 505 is configured to send, to another network device in the target broadcast domain, a BUM packet that is not discarded. The another network device is a network device that is in the target broadcast domain and that is different from a network device that sends, to the traffic controller, the BUM packet that is not discarded, and a source IP address of the BUM packet that is not discarded is an IP address of the network device that sends, to the traffic controller, the BUM packet that is not discarded.

Specifically, the receiving module 501 is configured to receive, through the tunnel based on a member list, the BUM packet encapsulated by the network device in the target broadcast domain. The member list is configured in the traffic controller, and the member list records identifiers of the network devices in the target broadcast domain.

Optionally, that the statistics collection module 502 is configured to collect statistics about the BUM packet, and the determining module 503 is configured to determine whether the BUM packet exceeds a preset BUM traffic threshold of the target object includes one or a combination of more than one of the following manners: the statistics collection module 502 is configured to collect, based on a network identifier of the target broadcast domain, statistics about a BUM packet in the target broadcast domain, and the determining module 503 is configured to determine whether a BUM traffic amount of the target broadcast domain exceeds a preset BUM traffic threshold of the target broadcast domain; the statistics collection module 502 is configured to collect, based on a port IP address of the network device, statistics about a BUM traffic amount of the network device, and the determining module 503 is configured to determine whether the BUM traffic amount of the network device exceeds a preset BUM traffic threshold of the network device; and the statistics collection module 502 is configured to collect, based on a MAC address or an IP address of a host, statistics about a BUM traffic amount of the host, and the determining module 503 is configured to determine whether the BUM amount of the host exceeds a preset BUM traffic threshold of the host.

It should be noted that, from detailed description of the embodiment in FIG. 7 or FIG. 10, a person skilled in the art may clearly learn about an implementation method of each function module included in the traffic controller 50. Therefore, for brevity of this specification, details are not described herein again.

As shown in FIG. 13, the network device 60 may include a receiving module 601, a processing module 602, and a sending module 603.

The receiving module 601 is configured to receive a BUM packet sent by a host.

The processing module 602 is configured to encapsulate the BUM packet.

The sending module 603 is configured to send the encapsulated BUM packet to a traffic controller through the tunnel based on a member list. The member list is configured in the network device, and the member list records an identifier of the traffic controller in the target broadcast domain.

Optionally, after the sending the encapsulated BUM packet to a traffic controller through the tunnel, the following is included: the receiving module 6*oi* is configured to receive traffic alarm information sent by the traffic controller; and the processing module 602 is configured to control BUM traffic based on the traffic alarm information, to reduce a quantity of encapsulated BUM packets to be sent to the traffic controller or stop sending an encapsulated BUM packet to the traffic controller.

It should be noted that, from detailed description of the embodiment in FIG. 7 or FIG. 10, a person skilled in the art may clearly learn about an implementation method of each function module included in the network device 60. Therefore, for brevity of this specification, details are not described herein again.

In addition, an embodiment of the present disclosure further provides a communications system. The communications system includes a traffic controller and a network device. The traffic controller and the network device are respectively corresponding to the traffic controller and the network device in the embodiment in FIG. 7 or FIG. 10.

In specific implementation, the traffic controller may be the traffic controller represented by the apparatus shown in FIG. 11, or may be the traffic controller 50 shown in FIG. 12. The network device may be the network device represented by the apparatus shown in FIG. 11, or may be the network device 6*o* shown in FIG. 13.

In the foregoing embodiments, description of the embodiments has different emphases. For a part that is not described in detail in an embodiment, refer to related description of another embodiment.

The foregoing embodiments are merely intended to describe the technical solutions of the present disclosure, but are not intended to limit the present disclosure. Although the present disclosure is described in detail with reference to the foregoing embodiments, a person of ordinary skill in the art should further understand that any modifications and variations made to the technical solutions described in the foregoing embodiments or any equivalent replacements made to some technical features thereof shall fall within the scope of the technical solutions in the embodiments of the present disclosure.

What is claimed is:

1. A method, comprising:
    receiving, by a traffic controller through a tunnel, a broadcast, unknown-unicast and multicast traffic (BUM) packet encapsulated by a first network device in a target broadcast domain of a communications network, wherein the target broadcast domain comprises the traffic controller, a plurality of network devices comprising the first network device, and plurality of hosts, and wherein the traffic controller is in a communications connection to each network device of the plurality of network devices through a respective tunnel;
    collecting, by the traffic controller based on the BUM packet, statistics about a BUM traffic amount of a target object within a preset time period, wherein the statistics about the BUM traffic amount of the target object comprise statistics about a quantity of packets or a packet length, and wherein:
        the target object comprises:
            the target broadcast domain;
            one or more of the plurality of network devices; or
            a first host of the plurality of hosts that is connected to one or more network device of the plurality of network devices in the target broadcast domain;
    determining whether the BUM traffic amount is greater than a preset BUM traffic threshold of the target object; and
    in response to determining that the BUM traffic amount is greater than the preset BUM traffic threshold, controlling, by the traffic controller, BUM traffic of the target object, to reduce the BUM traffic of the target object, wherein controlling, by the traffic controller, the BUM traffic of the target object comprises: processing, by the traffic controller, a second BUM packet of the target object by discarding the second BUM packet of the target object, wherein the second BUM packet has a priority lower than a preset level or is repeatedly received for more than a preset quantity of times within a unit of time.

2. The method according to claim 1, wherein receiving the BUM packet comprises:
    receiving, by the traffic controller through the tunnel based on a member list, the BUM packet encapsulated by the first network device in the target broadcast domain, wherein the member list is configured in the traffic controller, and the member list records identifiers of the plurality of network devices in the target broadcast domain.

3. The method according to claim 1, wherein collecting, by the traffic controller based on the BUM packet, statistics about the BUM traffic amount of the target object within the preset time period, and determining whether the BUM traffic amount is greater than the preset BUM traffic threshold of the target object, comprises:
    collecting, by the traffic controller based on a network identifier of the target broadcast domain, statistics about a BUM traffic amount of the target broadcast domain, and determining whether the BUM traffic amount of the target broadcast domain exceeds a preset BUM traffic threshold of the target broadcast domain;

collecting, by the traffic controller based on a port internet protocol (IP) address of a second network device of the plurality of network devices, statistics about a BUM traffic amount of the second network device, and determining whether the BUM traffic amount of the second network device exceeds a preset BUM traffic threshold of the second network device; or collecting, by the traffic controller based on a media access control (MAC) address or an IP address of a first host of the plurality of hosts, statistics about a BUM traffic amount of the first host, and determining whether the BUM traffic amount of the first host exceeds a preset BUM traffic threshold of the first host.

4. The method according to claim 1, wherein processing, by the traffic controller, the second BUM packet of the target object further comprises:

recording a log;
sending an alarm;
redirecting to a specified port; or
redirecting to a specified communication channel.

5. The method according to claim 4, wherein:

recording the log comprises recording feature information of the second BUM packet of the target object;
sending the alarm comprises sending traffic alarm information to a network controller, wherein the network controller is configured to monitor BUM traffic;
redirecting to the specified port comprises sending some or all of a plurality of BUM packets to the specified port; and
redirecting to a specified communication channel comprises sending some or all of a plurality of BUM packets of the target object to the specified communication channel.

6. The method according to claim 4, further comprising:

after controlling, by the traffic controller, the BUM traffic of the target object, sending, by the traffic controller to another network device in the target broadcast domain, a third BUM packet that is not discarded, wherein the another network device is comprised in the target broadcast domain and is different from a third network device that sends, to the traffic controller, the third BUM packet that is not discarded, and a source IP address of the third BUM packet that is not discarded is an IP address of the third network device that sends, to the traffic controller, the third BUM packet that is not discarded.

7. A method, comprising:

receiving, by a network device, a broadcast, unknown-unicast and multicast traffic (BUM) packet sent by a host, wherein a target broadcast domain of a communications network comprises a traffic controller, the network device, and the host, the host is connected to the network device, and the traffic controller is in a communications connection to the network device through a tunnel;
encapsulating, by the network device, the BUM packet to obtain a first encapsulated BUM packet;
sending, by the network device, the first encapsulated BUM packet to the traffic controller through the tunnel based on a member list, wherein the member list is configured in the network device, and the member list records an identifier of the traffic controller in the target broadcast domain;
after sending the first encapsulated BUM packet to the traffic controller through the tunnel, receiving, by the network device, traffic alarm information sent by the traffic controller, wherein the traffic alarm information indicates that traffic in a preset time period exceeds a preset limit; and
in response to receiving the traffic alarm information sent by the traffic controller, stopping sending, by the network device, a second encapsulated BUM packet to the traffic controller, wherein the second encapsulated BUM packet is related to the first encapsulated BUM packet.

8. A traffic controller, comprising:

an Ethernet switching chip;
a device interface, is configured to connect to a first network device in a target broadcast domain;
a processor; and
a non-transitory memory, configured to store program code executable by the processor, the program code including instructions to control the Ethernet switching chip to:
receive, through a tunnel, a first broadcast, unknown-unicast and multicast traffic (BUM) packet encapsulated by the first network device;
collect, based on the first BUM packet, statistics about a BUM traffic amount of a target object within a preset time period, wherein the statistics about the BUM traffic amount of the target object comprise statistics about a quantity of packets or a packet length, and wherein:
the target object is:
the target broadcast domain;
a second network device in the target broadcast domain; or
a host connected to the first network device in the target broadcast domain;
determine whether the BUM traffic amount is greater than a preset BUM traffic threshold of the target object; and
in response to determining that the BUM traffic amount is greater than the preset BUM traffic threshold, controlling BUM traffic of the target object, to reduce the BUM traffic of the target object, wherein controlling, by the traffic controller, the BUM traffic of the target object comprises: processing, by the traffic controller, a second BUM packet of the target object by discarding the second BUM packet of the target object, wherein the second BUM packet has a priority lower than a preset level or is repeatedly received for more than a preset quantity of times within a unit of time.

9. The traffic controller according to claim 8, wherein receiving, through the tunnel, the first BUM packet encapsulated by the first network device comprises receiving, through the tunnel and according to a member list, the first BUM packet encapsulated by the first network device in the target broadcast domain according to a member list, wherein the member list records identifiers of a plurality of network devices in the target broadcast domain.

10. The traffic controller according to claim 8, wherein collecting, based on the BUM packet, the statistics about the BUM traffic amount of the target object within the preset time period, and determining whether the BUM traffic amount is greater than the preset BUM traffic threshold of the target object, comprises:

collecting, based on a network identifier of the target broadcast domain, statistics about a BUM traffic amount of the target broadcast domain, and determining whether the BUM traffic amount of the target broadcast domain exceeds a preset BUM traffic threshold of the target broadcast domain.

11. The traffic controller according to claim 8, wherein collecting, based on the first BUM packet, the statistics about the BUM traffic amount of the target object within the preset time period, and determining whether the BUM traffic amount is greater than the preset BUM traffic threshold of the target object, comprises:
   collecting, based on a port internet protocol (IP) address of a fourth network device, statistics about a BUM traffic amount of the fourth network device, and determining whether the BUM traffic amount of the fourth network device exceeds a preset BUM traffic threshold of the fourth network device.

12. The traffic controller according to claim 8, wherein collecting, based on the first BUM packet, the statistics about the BUM traffic amount of the target object within the preset time period, and determining whether the BUM traffic amount is greater than the preset BUM traffic threshold of the target object, comprises:
   collecting, based on a media access control (MAC) address or an IP address of a host, statistics about a BUM traffic amount of the host, and determining whether the BUM traffic amount of the host exceeds a preset BUM traffic threshold of the host.

13. The traffic controller according to claim 8, wherein processing the second BUM packet of the target object further comprises:
   recording a log;
   sending an alarm;
   redirecting to a specified port; or
   redirecting to a specified communication channel.

14. The traffic controller according to claim 13, wherein:
   recording the log comprises recording feature information of the second BUM packet;
   sending the alarm comprises sending traffic alarm information to a network controller, wherein the network controller is configured to monitor BUM traffic;
   redirecting to the specified port comprises: sending some or all of a plurality of BUM packets to the specified port; and
   redirecting to a specified communication channel comprises sending some or all of a plurality of BUM packets to the specified communication channel.

15. The traffic controller according to claim 13, wherein the program code further includes instructions to control the Ethernet switching chip to:
   after controlling BUM traffic of the target object, send, to another network device in the target broadcast domain, a third BUM packet that is not discarded, wherein the another network device is in the target broadcast domain and is different from a fourth network device that sends, to the traffic controller, the third BUM packet that is not discarded, and a source IP address of the third BUM packet that is not discarded is an IP address of the fourth network device that sends, to the traffic controller, the third BUM packet that is not discarded.

16. A network device, comprising:
   an Ethernet switching chip;
   a device interface, configured to connect to a traffic controller;
   a processor; and
   a non-transitory memory, configured to store program code executable by the processor, the program code including instructions to control the Ethernet switching chip to:
   receive a first BUM packet sent by a host;
   encapsulate the first BUM packet to obtain an first encapsulated BUM packet; and
   send the first encapsulated BUM packet to the traffic controller through a tunnel based on a member list, wherein the member list is configured in the network device, and the member list records an identifier of the traffic controller in a target broadcast domain;
   after sending the first encapsulated BUM packet to the traffic controller through the tunnel, receive traffic alarm information sent by the traffic controller, wherein the traffic alarm information indicates that traffic in a preset time period exceeds a preset limit; and
   in response to receiving the traffic alarm information sent by the traffic controller, reducing a quantity of encapsulated BUM packets to be sent to the traffic controller.

* * * * *